United States Patent [19]

Takanashi

[11] Patent Number: 5,604,565
[45] Date of Patent: Feb. 18, 1997

[54] PHOTOGRAPHIC PRINTING DEVICE AND FILM CARRIER

[75] Inventor: Teruo Takanashi, Kanagawa, Japan

[73] Assignee: Fuji Photo Film Co., Ltd., Kanagawa, Japan

[21] Appl. No.: 474,714

[22] Filed: Jun. 7, 1995

[30] Foreign Application Priority Data

Sep. 14, 1994 [JP] Japan .................... 6-220541
Sep. 14, 1994 [JP] Japan .................... 6-220542

[51] Int. Cl.$^6$ .................... G03B 27/52; G03B 27/00; G03B 27/72
[52] U.S. Cl. .................... 355/40; 355/18; 355/35
[58] Field of Search .................... 355/35, 18, 30, 355/40, 48, 74, 75, 77

[56] References Cited

U.S. PATENT DOCUMENTS

| | | | |
|---|---|---|---|
| 4,088,404 | 5/1978 | Zahn et al. | 355/29 |
| 4,990,950 | 2/1991 | Tokuda | 355/38 |
| 5,043,758 | 8/1991 | Nealon | 355/40 |
| 5,162,842 | 11/1992 | Shiota | 355/40 |
| 5,317,364 | 5/1994 | Fields | 355/40 |
| 5,467,165 | 11/1995 | Jacob et al. | 355/40 |

Primary Examiner—Arthur T. Grimley
Assistant Examiner—Herbert V. Kerner
Attorney, Agent, or Firm—Sughrue, Mion, Zinn, Macpeak & Seas

[57] ABSTRACT

A photographic printing device and film carrier. A negative film is inserted into the film carrier. When a leading end portion of the film is placed in a set state of being nipped by rollers, a conveyed amount count value is set to zero. While the film is conveyed, the count value is updated, and a position of an image recorded on the film is detected by detecting an edge of the image. A detected image is positioned at an exposure position, and print-exposure processing is carried out. A determination is made as to whether a film end flag is on by detecting a trailing end of the film. When the flag is not on, processing waits until a PASS key or a print designation key is turned on. When the trailing end of the film has not yet been detected and the PASS key is turned on, an image is positioned, and print-exposure continues. When either the trailing end of the film is detected or a print completion designation key is turned on, the film is conveyed in the reverse direction until the count value becomes zero, and returns to its set state.

20 Claims, 14 Drawing Sheets

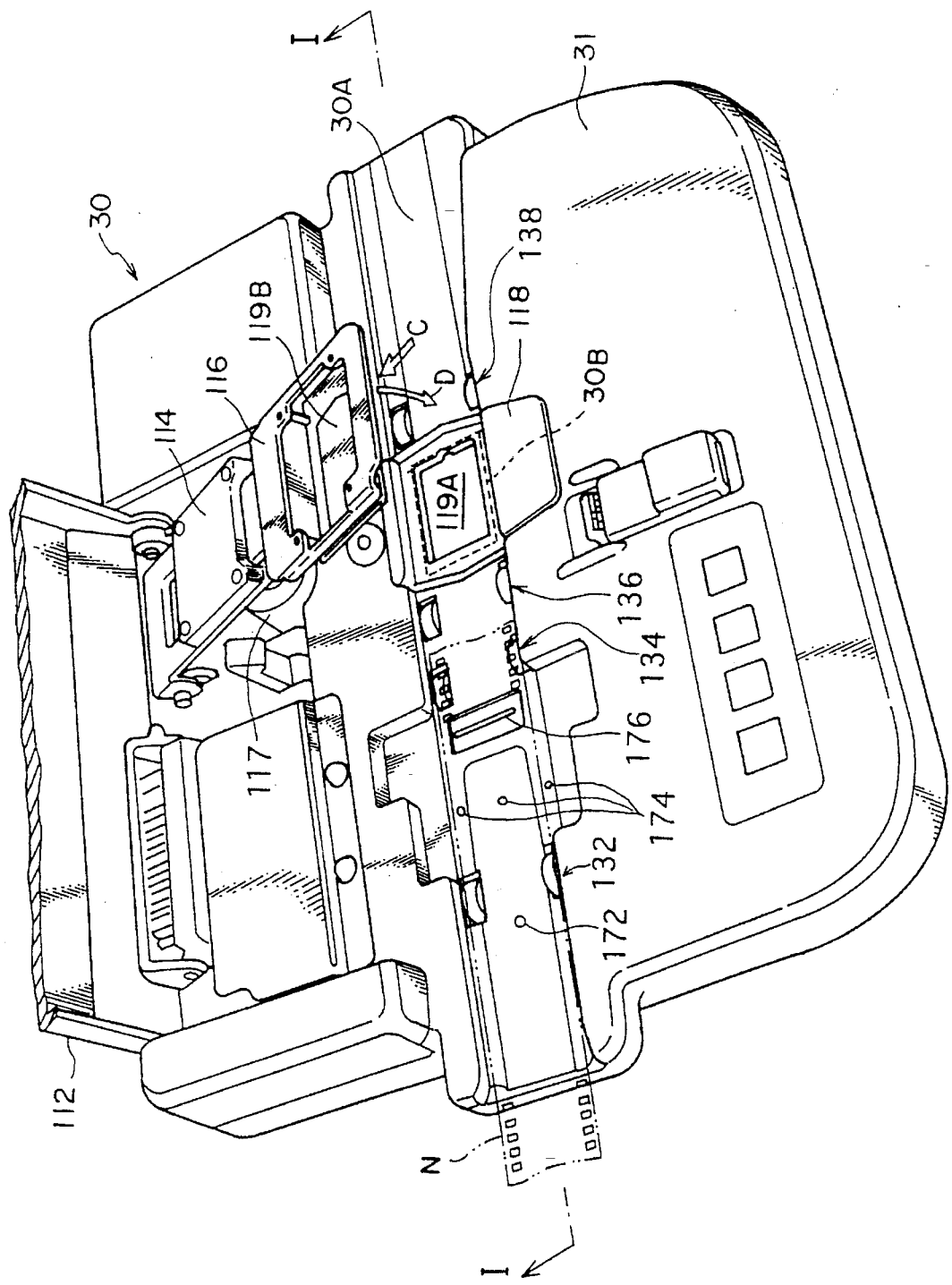

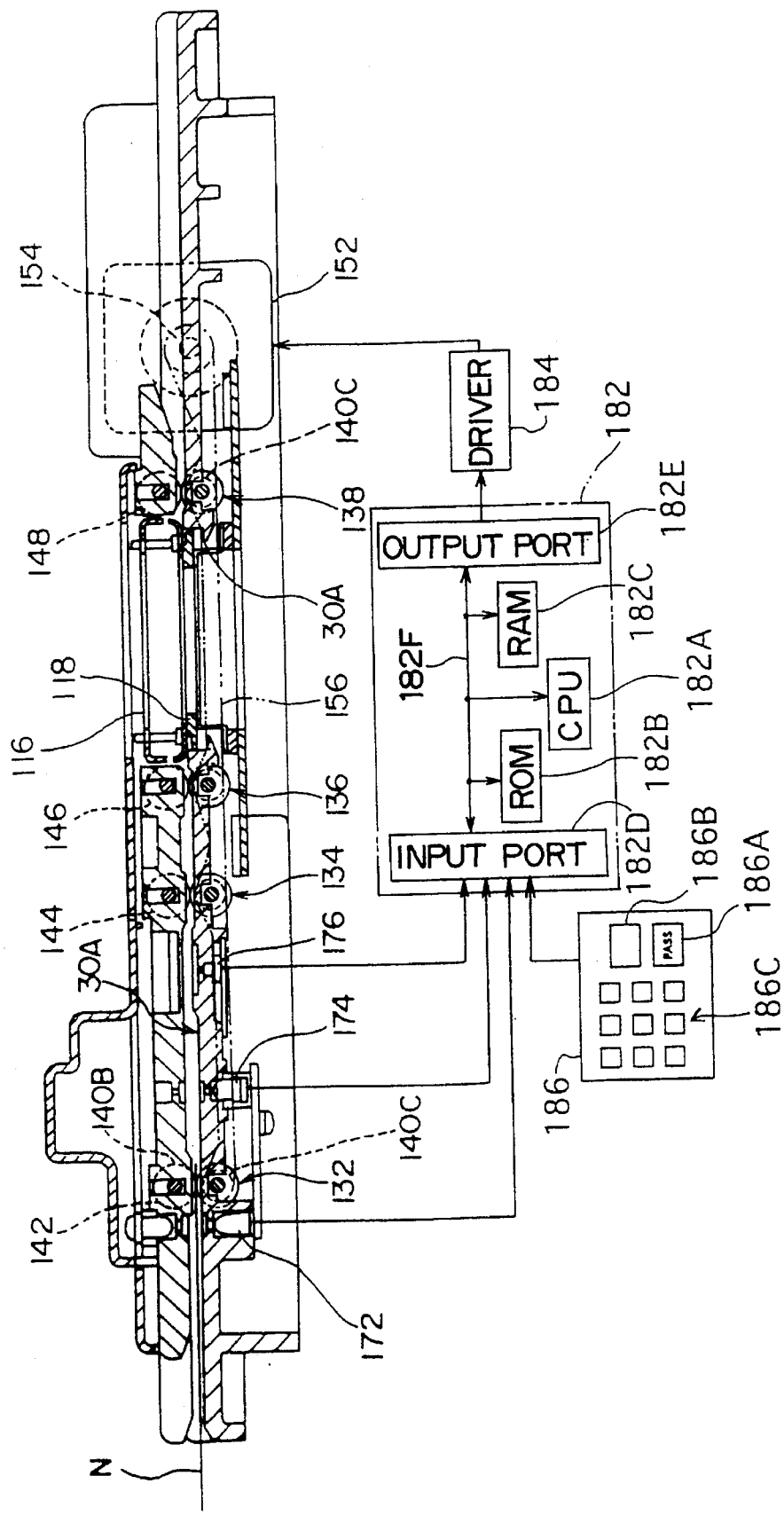

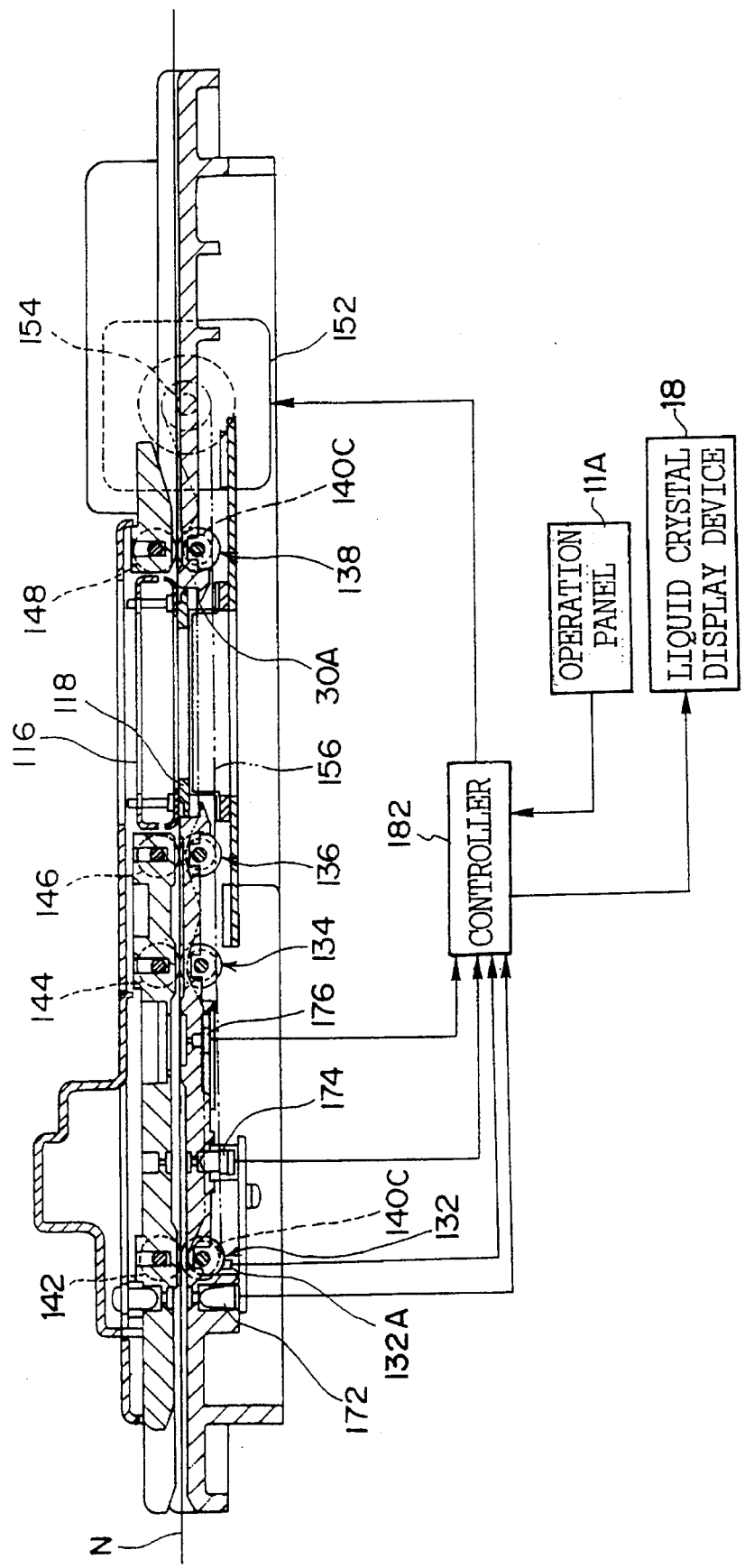

PHOTOGRAPHIC PRINTING DEVICE AND FILM CARRIER

BACKGROUND OF THE INVENTION

1. Field of the Invention

The present invention relates to a photographic printing device, and in particular, to a photographic printing device and a film carrier in which a film, on which a plurality of images are recorded along a predetermined direction, is conveyed, light is illuminated onto an image positioned at an exposure position, and the image is printed onto a photosensitive material.

2. Description of the Related Art

Conventional photographic printing devices are known in which light is illuminated onto an image recorded on a photographic film, and the film image is printed onto a photographic printing paper due to the light passing through the film image being illuminated onto the photographic printing paper. A film carrier which conveys the photographic film is disposed in the photographic printing device. A photographic film, on which images are recorded, is set at the film carrier. The film carrier is equipped with a sensor for optically detecting the images recorded on the photographic film. Each time a designation signal to position an image is inputted by an operator, the photographic film is conveyed, the image position is determined based on the results of image detection by the sensor, and the image is positioned at an exposure position to which light is illuminated.

Accordingly, each time a designation signal to position an image is inputted by an operator, the plurality of images recorded on the photographic film are successively positioned at the exposure position by the film carrier, and successive printing of the images onto photographic printing papers is carried out. When printing of all of the images, which are recorded on the photographic film and which are to be printed, has been completed, the operator stops inputting the designation signal. (During this time, the image for which printing was effected last is positioned at the exposure position). The operator replaces the photographing film set at the film carrier with another photographic film.

However, in accordance with the above structure, even at times other than during exposure, one of the plurality of images recorded on the photographic film set at the film carrier is positioned at the exposure position. In the photographic printing device, generally, the exposure lamp is always lit so that the lamp illuminance remains stable and the like. The printing of an image onto a photographic printing paper is carried out by opening a black shutter provided between the film and the photographic printing paper. Accordingly, the light from the exposure lamp is always illuminated onto the image positioned at the exposure position.

As a result, in a state in which one of the plurality of images recorded on the photographic film is positioned at the exposure position, when input of the designation signal to position an image is interrupted by, ior example, the operator being away from the photographic printing device, or when the photographic film is not changed for a long time even though printing of the images has been completed, the light is illuminated to the image positioned at the exposure position for a long period of time. Accordingly, fading of the image may occur.

In order to prevent fading, the operator must always be near the photographic printing device and must successively input designation signals to position the images so that the images are printed successively. After printing of the images recorded on the photographic film set at the film carrier has been completed, the operator must promptly carry out the complicated work involved in changing the film and the like.

Further, at the photographic printing device, a film for condition setting/management is readied in advance in order to set and manage the exposure conditions such that the image quality of the printed images is constant regardless of fluctuations in conditions such as deterioration of the light source, fading of the filters for adjusting the light, and the like. In order to appropriately manage the exposure conditions for various images exposed and recorded on a film at different exposure amounts, a plurality of images are recorded on the film for condition setting/management at respectively different exposure amounts. The film for condition setting/management is periodically set at the film carrier of the photographic printing device, and successive printing of the plurality of images onto photographic printing papers is repeated a plurality of times.

At the film carrier of the photographic printing device, the printing of images by the procedures described above is realized by the process of repeating the returning of the film once by the designation of an operator after the plurality of images have successively been printed. Because this process is carried out by the operator's designation, a drawback arises in that fading of the images recorded on the film for condition setting/management occurs easily in the same way as described above due to the input of the designations being interrupted or the like. Further, the operator's work is complicated.

When conveying of the photographic film by one image frame each time a designation signal is inputted is continued, in a case in which a designation signal is inputted after the print-exposure of the final image frame closest to the trailing end of the photographic film has been completed, the photographic film is further conveyed, and as a result, the photographic film may separate from the film carrier. If the photographic film separates from the film carrier, the operator must load the photographic film at the negative carrier again, and the burden on the operator increases.

SUMMARY OF THE INVENTION

In view of the aforementioned, a first object of the present invention is to provide a photographic printing device in which an operator's burden can be lightened, and in which fading of images recorded on a film can be prevented.

A second object of the present invention is to provide a film carrier in which an operator's burden can be lightened, and in which an end of a photographic film does not separate from the film carrier even in cases in which a designation signal is inputted.

In order to achieve the above-mentioned first object, a photographic printing device relating to a first aspect of the present invention includes: conveying means for conveying a film on which a plurality of images are recorded; positioning means for positioning, at an exposure position, an image recorded on the film conveyed by the conveying means; printing means for printing onto a photosensitive material the image positioned at the exposure position by the positioning means, by illuminating light to the image; designating means for designating completion of printing of images recorded on the film; and control means for controlling the conveying means to convey the film to cause a position at which the light is illuminated to correspond to a position on the film where none of the plurality of images are, when completion of printing is designated by the designating means, wherein the conveying means retains the film at the position in a state in which the film is nipped by the conveying means.

The photographic printing device relating to the second aspect of the present invention is a photographic printing device comprising: conveying means for conveying a film on which a plurality of images are recorded; positioning means for positioning, at an exposure position, an image recorded on the film conveyed by the conveying means; printing means for printing onto a photosensitive material the image positioned at the exposure position by the positioning means, by illuminating light to the image; determining means for determining whether printing of all images, which are recorded on the film and which are to be printed, has been completed; and control means for controlling the conveying means to convey the film to cause a position at which the light is illuminated to correspond to a position on the film where none of the plurality of images are, when the determining means determines that printing has been completed, wherein the conveying means retains the film at the position in a state in which the film is nipped by the conveying means completed.

In the third aspect of the present invention, in the second aspect, when printing of a plurality of images recorded on a film for condition setting/management is effected, the determining means also determines whether condition setting/managing processing has been completed, and until the determining means determines that condition setting/managing processing has been completed, each time the determining means determines that printing has been completed, the control means controls the conveying means to convey the film for condition setting/management to a position at which the light is illuminated to none of the plurality of images.

In the fourth aspect of the present invention, the second aspect is further provided with a detecting means for detecting an end portion of the film at the film conveying direction upstream side. On the basis of detection of the end portion of the film by the detecting means, the determining means determines whether printing of all of the images to be printed has been completed.

In the fifth aspect of the present invention, the second aspect is further provided with designating means for designating a number of frames of images to be printed, wherein when printing of images of the number of frames designated by the designating means is completed, the determining means determines that printing of all images to be printed has been completed.

In order to achieve the above-described second object, the film carrier of the sixth aspect of the present invention includes inputting means for inputting a designation signal which designates conveying of a photographic film on which image frames are recorded and positioning at an exposure position of an image frame to be print-exposed onto a photosensitive material; conveying means for conveying the photographic film; photographic film end portion detecting means for detecting a photographic film end portion at a conveying direction upstream side; determining means for determining whether an image frame located at a position nearest to the photographic film end portion is positioned in a conveying direction downstream side region which includes the exposure position; and control means for controlling the conveying means to convey the photographic film such that the image frame to be print-exposed is positioned at the exposure position, when results of the determination of the determining means are negative and the designation signal is inputted, and for controlling the conveying means to convey the photographic film such that the photographic film end portion detected by the photographic film end portion detecting means is positioned at a position at which the photographic film end portion does not separate from the conveying means, when results of the determination of the determining means are affirmative and the designation signal is inputted.

In the seventh aspect of the present invention, the position at which the photographic film end portion does not separate from the conveying means is any position within a predetermined range which includes the exposure position.

in the first aspect, the film on which a plurality of images are recorded is conveyed by the conveying means, and an image is positioned at the exposure position by the positioning means. At the printing means, light is illuminated to the image positioned at the exposure position, and the image is printed onto the photosensitive material. Further, a designating means for designating completion of printing of the images recorded on the film is provided. In a case in which completion of printing is designated by the designating means, the control means controls the conveying means to convey the film to a position at which the light is not illuminated to any of the plurality of images, wherein the conveying means retains the film at the position in a state in which the film is nipped by the conveying means. Specifically, the control means controls the conveying means to convey the film, for example, such that a portion of the film on which images are not recorded is positioned at the exposure position, or such that the film is not positioned at the exposure position, wherein the conveying means retains the film at the position in a state in which the film is nipped by the conveying means. A portion of the film on which images are not recorded may be, for example, a position corresponding to an unexposed area if the film is a negative film. When the film is not positioned at the exposure position, the film may be positioned at, for example, a position at which the film is apart from the exposure position (a position at which none of the portions of the film correspond to the exposure position, i.e., a so-called standby state).

If the operator designates the completion of printing via the designating means, the film is conveyed to a position at which the light is not illuminated to any of the plurality of images, and fading of the images recorded on the film can be prevented. Therefore, if the operator designates completion of printing, the film is automatically conveyed at an arbitrary timing to a position at which the images do not fade due to the light, not only at times when printing of all of the images, which are recorded on the photographic film and which are to be printed, has been completed, but also in cases before printing of all of the images has been completed. Accordingly, the burden on the operator is lessened, and fading of the images recorded on the film can be prevented.

In the second aspect, in place of the designating means of the first aspect, a determining means is provided which determines whether printing of all of the images, which are recorded on the film and which are to be printed, has been completed. When the determining means determines that printing has been completed, the control means controls the conveying means to convey the film to a position at which the light is not illuminated to any of the plurality of images, wherein the conveying means retains the film at the position in a state in which the film is nipped by the conveying means.

In the second aspect, the film is automatically conveyed at an arbitrary timing to a position at which fading of the images does not occur. In a case in which printing of all of the images, which are recorded on the film and which are to be printed, has been completed, even if the operator does not input any designation, a determination is automatically made as to whether printing of all of the images to be printed has been completed. Because the film is automatically conveyed to a position at which fading of the images due to the light does not occur, the burden on the operator is reduced, and fading of the images recorded on the film can be prevented.

In the second aspect, the film is not limited to general films, and a film for condition setting/management may also be used. In the setting/managing of exposure conditions, print-exposure is effected a plurality of times for each of the plurality of images recorded on a film for condition setting/management. As described previously, the work involved in positioning each image at the exposure position is complex. As a result, in order to lighten the operator's burden, for example, after print-exposure processing has been completed one time, the conveying of the film is controlled such that the image which was positioned at the exposure position first is again positioned at the exposure position.

However, in setting/managing processing of exposure conditions, print-exposure processing is effected once for each of the plurality of images recorded on the film for condition setting/management. Thereafter, processings such as developing processing and the like are carried out, and the film is set in a standby state for several minutes until the processing results are outputted. After the processing results are outputted, a determination is made based on the processing results as to whether the next print-exposure processing is to be effected. As a result, there is a strong possibility that fading of the image will occur in the standby state. Further, the determination as to whether the next print-exposure processing is to be carried out may be made automatically, or may be made by the operator. In a case in which the determination is made by the operator, even if the processing results have been outputted, there are cases in which a designation by the operator to execute print-exposure processing again or a designation by the operator to complete print-exposure processing is not effected 4or a long time. In such cases, because the light is illuminated onto the image recorded on the film for condition setting/management for a long period of time, the fading of the image is even more marked.

In consideration of the aforementioned, in the third aspect of the present invention, in a case in which a plurality of images recorded on a film for condition setting/management are printed, it is preferable that the determining means also determines whether condition setting/managing processing has been completed, and that until the determining means determines that condition setting/managing processing has been completed, each time the determining means determines that printing has been completed, the control means controls the conveying means to convey the film to a position at which the light is not illuminated to any of the plurality of images, wherein the conveying means retains the film at the position in a state in which the film is nipped by the conveying means. The determination by the determining means may be effected automatically, or may be effected on the basis of a designation from the operator.

Each time print-exposure processing of the plurality images recorded on the film for condition setting/management is completed one time, the film is conveyed to a position at which the light is not illuminated to any of the plurality of images. Therefore, in the standby state which lasts until the processing results have been outputted, fading of the images recorded on the film for condition setting/management can be prevented. Further, when the determination by the determining means is effected on the basis of a designation from the operator, fading of the images recorded on the film for condition setting/management can be prevented even if, although the processing results have been outputted, a designation to carry out print-exposure processing again or a designation to complete print-exposure processing is not given for a long time and the standby state continues for a long time. In this way, in accordance with the third aspect, fading of images recorded on a film for condition setting/management, which are particularly prone to fading due to periodic printing, can be prevented.

When the second aspect is further provided with a detecting means which is disposed in a vicinity of the exposure position and which detects the end portion of the film, when the end portion of the film is detected by the detecting means, the determining means determines that printing of all of the images to be printed has been completed. When the end portion of the film being conveyed by the conveying means is detected by the detecting means disposed in a vicinity of the exposure position, this end portion is the end portion at the rear side along the conveying direction of the film, i.e., this end portion is the trailing end. Therefore, it can be determined that the portions on which images are recorded have all passed by the exposure position. Specifically, it can be determined that printing of all of the images to be printed has been completed.

In the above description, it is automatically determined whether printing of all of the images to be printed has been completed. Therefore, as compared with a case in which, for example, an operator designates the number of frames of images recorded on the film and a determination is effected on the basis of the designated number of frames, there is no need for excess work on the part of the operator, and the burden on the operator can be lessened.

When the second aspect is further provided with a designating means for designating a number of frames of the images to be printed, when the printing of images of the number of frames designated by the designating means has been completed, the determining means determines that printing of all of the images to be printed has been completed. In particular, at times such as additional printing of images or the like, there are cases in which not all of the images recorded on the film are images to be printed, and only specific images among the images recorded on the film are images to be printed. The position at which an image to be printed is recorded and the trailing end of the film may be spaced far apart.

In the above-described fourth aspect, in this case as well, when the trailing end of the film is not conveyed once to a vicinity of the exposure position, it cannot be determined that printing of all of the images to be printed has been completed. Therefore, the determination requires time. In contrast, in the fifth aspect, the operator designates via the designating means the number of frames of images to be printed. Therefore, as compared with the fourth aspect, the operator's work increases slightly, but completion of printing of all of the images to be printed can be determined reliably and rapidly.

In the sixth aspect, the input means inputs a designation signal. Here, the designation signal is a signal which designates the conveying of the photographic film on which image frames are recorded and the positioning, at the exposure position, of an image frame to be print-exposed onto the photosensitive material.

The photographic film end portion detecting means detects the photographic film end portion at the conveying direction upstream side. The conveying means conveys the photographic film.

The determining means determines whether the image frame located at a position nearest to the photographic film end portion is positioned at a conveying direction downstream side region which includes the exposure position.

When the results of determination are negative and the designation signal is inputted, the control means controls the conveying means to convey the photographic film so that the image frame to be print-exposed is positioned at the exposure position.

In this way, when the conveying means conveys the photographic film, the image frame located at the position closest to the photographic film end portion is positioned at a conveying direction downstream side region which includes the exposure position. Accordingly, the results of determination by the determining means become affirmative.

When the results of determination of the determining means are affirmative and the designation signal is inputted, the control means controls the conveying means to convey the photographic film such that the photographic film end portion detected by the photographic film end portion detecting means is positioned at a position at which the photographic film end portion does not separate from the conveying means.

The position at which the photographic film end portion does not separate from the conveying means is, in the seventh aspect, any position in a predetermined range which includes the exposure position.

In this way, when the designation signal is inputted and the image frame located at the position nearest to the photographic film end portion is positioned at a conveying direction downstream side region which includes the exposure position, the photographic film is conveyed such that the photographic film end portion is positioned at a position at which the photographic film end portion does not separate From the conveying means. Therefore, due to the input of the designation signal, separation of the photographic film from the negative carrier can be prevented.

BRIEF DESCRIPTION OF THE DRAWINGS

FIG. 3 is a perspective view of a negative carrier relating to the first embodiment.

FIG. 4 is a schematic view illustrating a cross-section of the negative carrier along line I—I of FIG. 3 and illustrating a schematic structure of a controller.

FIG. 8 is a sectional view of the negative carrier taken along line I—I of FIG. 3.

DESCRIPTION OF THE PREFERRED EMBODIMENTS

Figure 1:
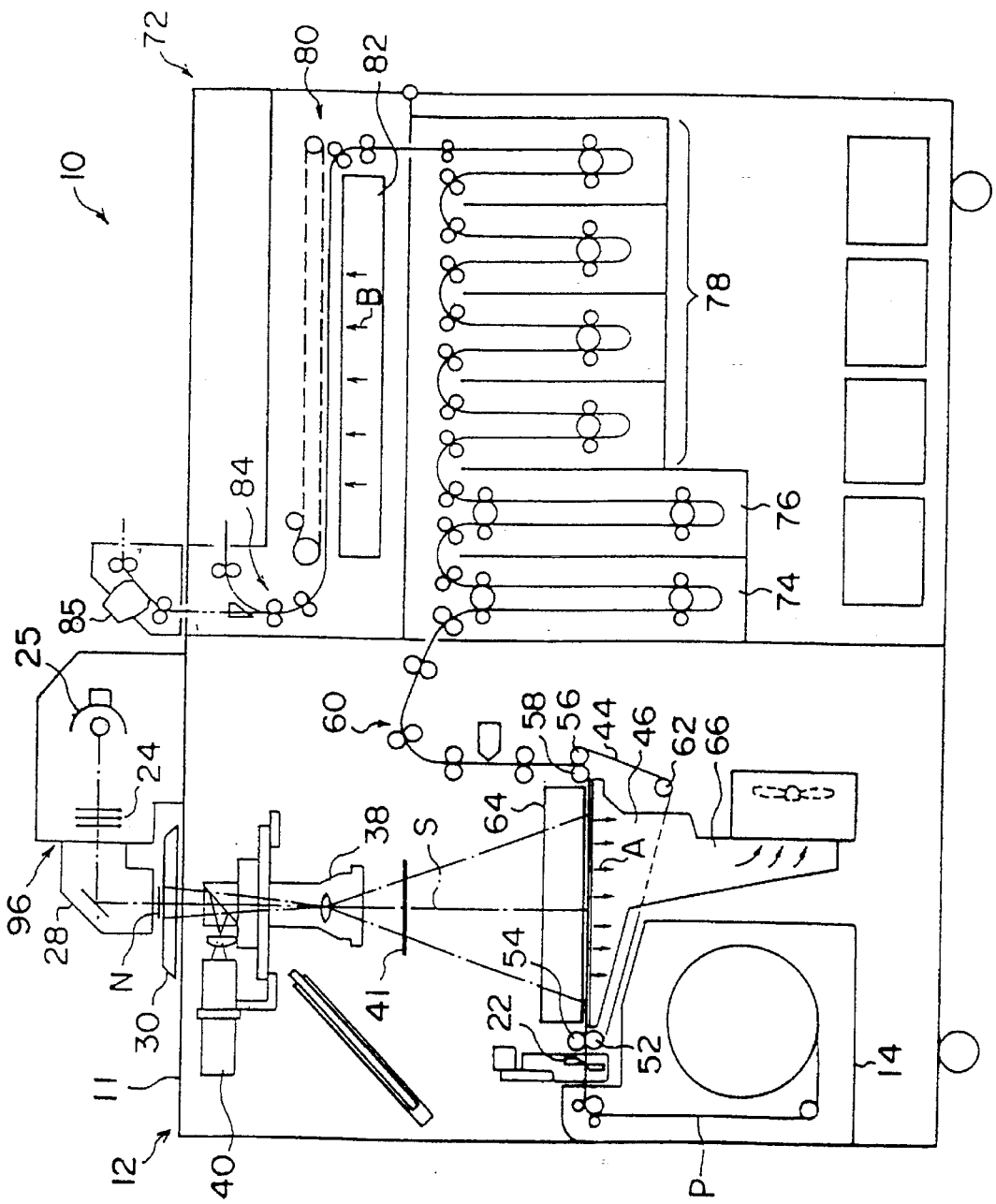
FIG. 1 is a schematic structural view of a printer processor relating to a first embodiment.
Figure 2:
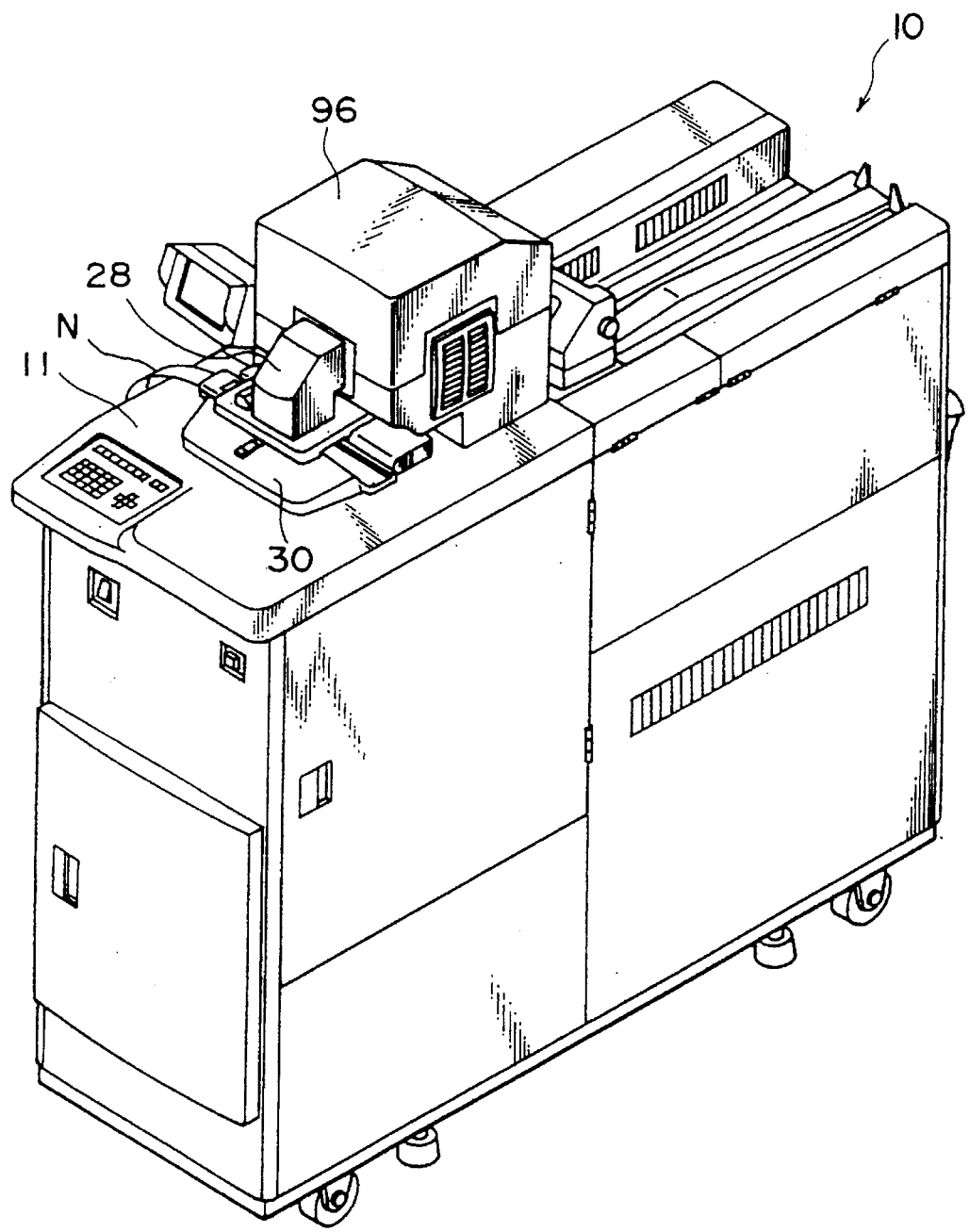
FIG. 2 is a perspective view of the printer processor relating to the first embodiment.

Preferred embodiments of the present invention will be described in detail hereinafter with reference to the appended drawings.
First Embodiment FIGS. 1 and 2 illustrate a schematic structure of a printer processor 10 relating to a first embodiment. The printer processor 10 is equipped with a photographic printing section 12 which serves as the photographic printing device of the present invention. A paper magazine 14, in which a photographic printing paper P which is the photosensitive material of the present invention is accommodated, is loaded in the photographic printing section 12.

A cutter 22 is disposed on the conveying path of the photographic printing paper P which has been pulled out from the paper magazine 14. A supporting stand 45 is disposed downstream of the cutter 22. A training roller 52, around which an endless belt 44 is trained, is disposed between the supporting stand 46 and the cutter 22. A nip roller 54 is disposed above the training roller 52. The endless belt 44 is nipped between the training roller 52 and the nip roller 54.

A guide roller 56 around which the endless belt 44 is trained is positioned at the photographic printing paper conveying direction downstream side of the supporting stand 46. A presser roller 58, whose lower surface is positioned at substantially the same height as the upper surface of the training roller 52, is disposed at a position adjacent to the guide roller 56. The outer periphery of the endless belt 44 is pressed by the presser roller 58. The endless belt 44 is trained around a tension roller 52 beneath the guide roller 56. Driving force of an unillustrated motor is transmitted to the tension roller 62 so that the endless belt 44 is rotated in a clockwise direction in FIG. 1.

An easel device 64 is provided above the endless belt 44 which moves on the supporting stand 46. When an image having borders is to be printed onto the photographic printing paper P, an unillustrated movable member within the easel device 64 moves and covers the periphery of the photographic printing paper P.

As illustrated in FIG. 2, a work table 11 is formed at the top portion of the photographic printing section 12. A light source device 96 is disposed at the rear side (the right side in FIG. 1) of the work table 11. An exposure lamp 25 and a light-adjusting filter portion 24 equipped with a plurality of light-adjusting filters are provided in the light source device 96. A diffusion box 28 is disposed adjacent to the light source device 96. The diffusion box 28 diffuses the light which has been emitted from the exposure lamp 25 and which has passed through the light-adjusting filter portion 24, and bends the axis of the light substantially 90° degrees and perpendicularly with respect to the work table 11. The bent light passes through a negative carrier 30 disposed on the top surface of the work table 11.

The position at the negative carrier 30 through which the light passes is called the exposure position. (This position will be described in greater detail later.) In order to maintain the lamp illuminance stable and the like, the exposure lamp 25 is always lit while the power source of the printer processor 10 is on. If a negative film N is positioned at the exposure position, the light which has been emitted from the exposure lamp 25 and which has passed through the light-adjusting filter portion 24 is illuminated onto the negative film N.

A density measuring device 40 which measures the density of the negative film N is disposed within the photographic printing section 12. The amount of correction of the exposure conditions at the time of print-exposure is computed on the basis of the data measured by the density measuring device 40. A zoom lens 38 is disposed under the density measuring device 40. A black shutter 41 is provided on the optical path between the zoom lens 38 and the easel device 64.

In the above-described structure, the photographic printing paper P, which has been advanced out of the paper magazine 14 at the photographic printing section 12, is cut to a predetermined length by the cutter 22 and is positioned on the supporting stand 46 on an optical axis S of the light. An image recorded on the negative film N is printed onto the photographic printing paper P. The photographic printing paper P, for which printing of an image has been completed, is conveyed via a conveying path 60 formed by a plurality of pairs of rollers to a processor section 72 at which developing processing, bleaching/fixing processing, washing processing and drying processing are carried out.

A developing tan 74, a bleaching/fixing tan 76, and a washing tan 78 are provided in the processor section 72. Developing solution, bleaching/fixing solution, and washing water are accumulated in the tanks, respectively. The photographic printing paper P is conveyed in a substantially U-shaped path in each of the tanks, and is submerged in the processing solutions accumulated in the respective tanks. Developing processing, bleaching/fixing processing and washing processing of the photographic printing paper P are thereby effected. The photographic printing paper P which has been subjected to washing processing is conveyed to a drying section 80. Drying air blown from a chamber 82 is blown to the photographic printing paper P so that the photographic printing paper P is dried thereby.

A conveying path 84 formed by a plurality of pairs of rollers is disposed at the photographic printing paper P conveying direction downstream side of the drying section 80. The photographic printing paper P, for which drying processing has been completed and which has been discharged from the drying section 80, is nipped by the respective pairs of rollers, is discharged to the exterior of the printer processor 10, and is stacked with other discharged photographic printing papers P. When setting, managing and the like of the exposure conditions are carried out, the photographic printing paper P, for which drying processing has been completed in the drying section 80, is conveyed toward a densitometer 85 disposed above the drying section 80. The density of the image printed on the photographic printing paper P is measured by the densitometer 85.

Next, the negative carrier 30 will be described. As illustrated in FIGS. 3 and 4, a cover 112, which can be opened and closed with respect to a base 31, is attached to the negative carrier 30. A negative film pass-through portion 30A is formed in the base 31. A mask 118 (also called an under negative mask) is mounted to a vicinity of the central portion (the exposure position) of the negative film pass-through portion 30A so as to correspond to a rectangular through-hole 30B.

A holder 114, which is attached to the base 31 so as to be pivotable in the same way as the cover 112, is provided in a vicinity of the axis of pivoting of the cover 112. A press plate 116 (also called an upper negative mask) is provided at the holder 114. A window portion 119A and a window portion 119B which correspond to the image frame are formed in the mask 118 and the press plate 116, respectively. The light is illuminated on the masks 116, 118, and passes through the window portion 119A and the window portion 119B.

When the cover 112 is in a closed state, the upper negative mask 116 is disposed such that a gap, which is of a size which allows for the conveying of the negative film N, is provided between the upper negative mask 116 and the under negative mask 118. In this state, due to electric power being supplied to a solenoid 117, the upper negative mask 116 moves in a direction of approaching the under negative mask 118 due to the magnetic force caused by the solenoid 117, so that the negative film N is nipped at a predetermined nipping pressure.

Three drive rollers 132, 134, 136 are rotatably supported at a negative film conveying direction upstream side of the mask 118 at the negative film pass-through portion 30A. A drive roller 138 is disposed so as to be rotatable at the negative film conveying direction downstream side of the mask 118. As illustrated in FIG. 4, the negative carrier 30 houses a motor 152. A timing belt 156 is trained around the drive shaft of the motor 152 via a pulley 154. The timing belt 156 is also trained around pulleys 140C attached to the drive rollers 132, 134, 136, 138, so that the drive rollers 132, 134, 136, 138 are rotated by the drive force of the motor 152.

Follower rollers 142, 144, 146, 148 are rotatably attached to the cover 112 so as to correspond to the drive rollers 132, 134, 136, 138. When the cover 112 is closed, the negative film N is nipped by the drive rollers 132, 134, 136, 138 and by the follower rollers 142, 144, 146, 148. As a result, the negative film N is conveyed along the negative film pass-through portion 30A.

As illustrated in FIG. 3, a light sensor 172 for detecting the leading end and the trailing end of the negative film N is disposed at the negative film conveying direction upstream side of the drive roller 132 at the negative film pass-through portion 30A. Further, a splice sensor 174, which detects splicing tape which is used when a plurality of negative films N are connected lengthwise to form one negative film, is disposed between the drive rollers 132, 134. An image detecting sensor 176 is disposed at the negative film conveying direction downstream side of the splice sensor 174.

The respective sensors 172, 174, 176 and the previously-described motor 152 are respectively connected to a controller 182. The controller 182 is equipped with a CPU 182A, a ROM 182B, a RAM 182C, an input port 182D, and an output port 182E. These elements are connected together via a bus 182F. The sensors 172, 174, 176 are connected to the input port 182D. The motor 152 is connected via a driver 184 to the output port 182E. Further, a keyboard 186, by which an operator gives various types of designations, is connected to the input port 182D. The keyboard 186 includes a PASS key 186A, by which the operator designates positioning of an image at the exposure position, a completion designation key 186B, for designating completion of image printing processing (and corresponding to the designating means of the present invention), a ten key 186C, for inputting various types of numeric information (and corresponding to the designating means of the present invention), as well as other keys.

Next, as operation of the present embodiment, first, the overall flow of processing at the printer processor 10 will be described. When the negative film N is inserted into the negative film pass-through portion 30A and the leading end portion of the negative film N is detected by the light sensor 172, driving of the motor 152 is started, and the drive rollers 132, 134, 136, 138 rotate. At this time, because the negative film N is nipped between the drive rollers 132, 134, 136, 138 and the follower rollers 142, 144, 146, 148, the negative film N is conveyed along the film pass-through portion 30A.

Next, when an image recorded on the negative film N is positioned at the exposure position (details of which will be described later), light from the light source device 96 is illuminated onto the positioned image. The light passing through the image is illuminated onto the photographic printing paper P positioned in advance on the supporting stand 45, and the image is thereby print-exposed onto the photographic printing paper P. When print-exposure has been completed, the negative film N is conveyed one frame, and the next photographic printing paper P is positioned on the supporting stand 45. Printing processing is thereby repeated.

The photographic printing paper P which has been print-exposed passes through the conveying path 60 and is sent into the processor section 72. First, the photographic printing paper P is conveyed in a substantially U-shaped path, within the developing tank 74 and is subject to developing processing. Next, the photographic printing paper P is conveyed in a substantial U-shape path within the bleaching/fixing tank 76 and the washing tank 78, respectively, and is subject to bleaching/fixing processing and washing processing. The photographic printing paper P is then conveyed to the drying section 80. The photographic printing paper P, which is discharged from the drying section 80, is nipped by the plurality of pairs of rollers and is discharged to the exterior of the printer processor 10 and stacked with other discharged papers.

Figure 5A:
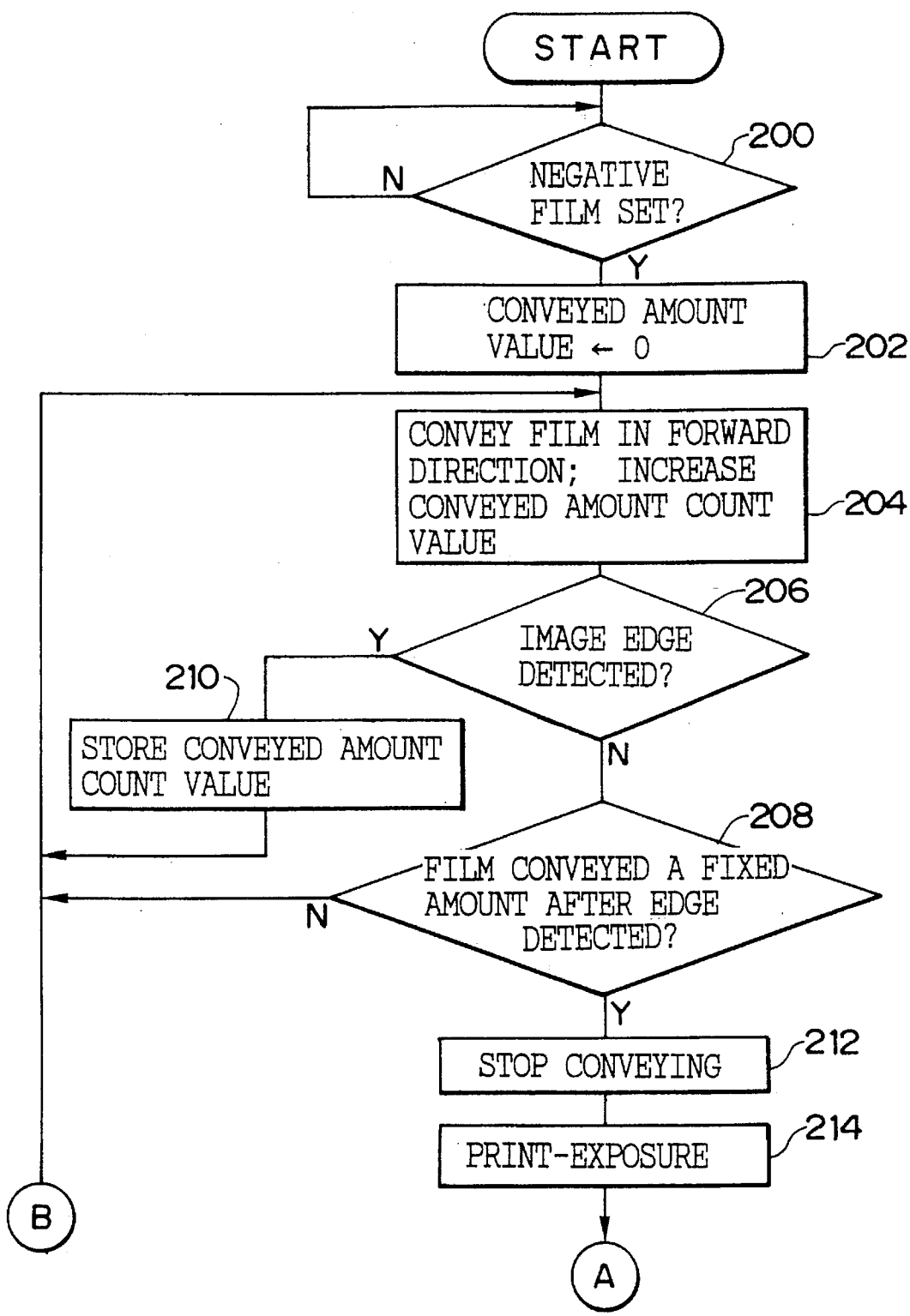
FIGS. 5A and 5B are flowcharts explaining negative film conveying control/printing processing relating to a first embodiment.
Figure 5B:
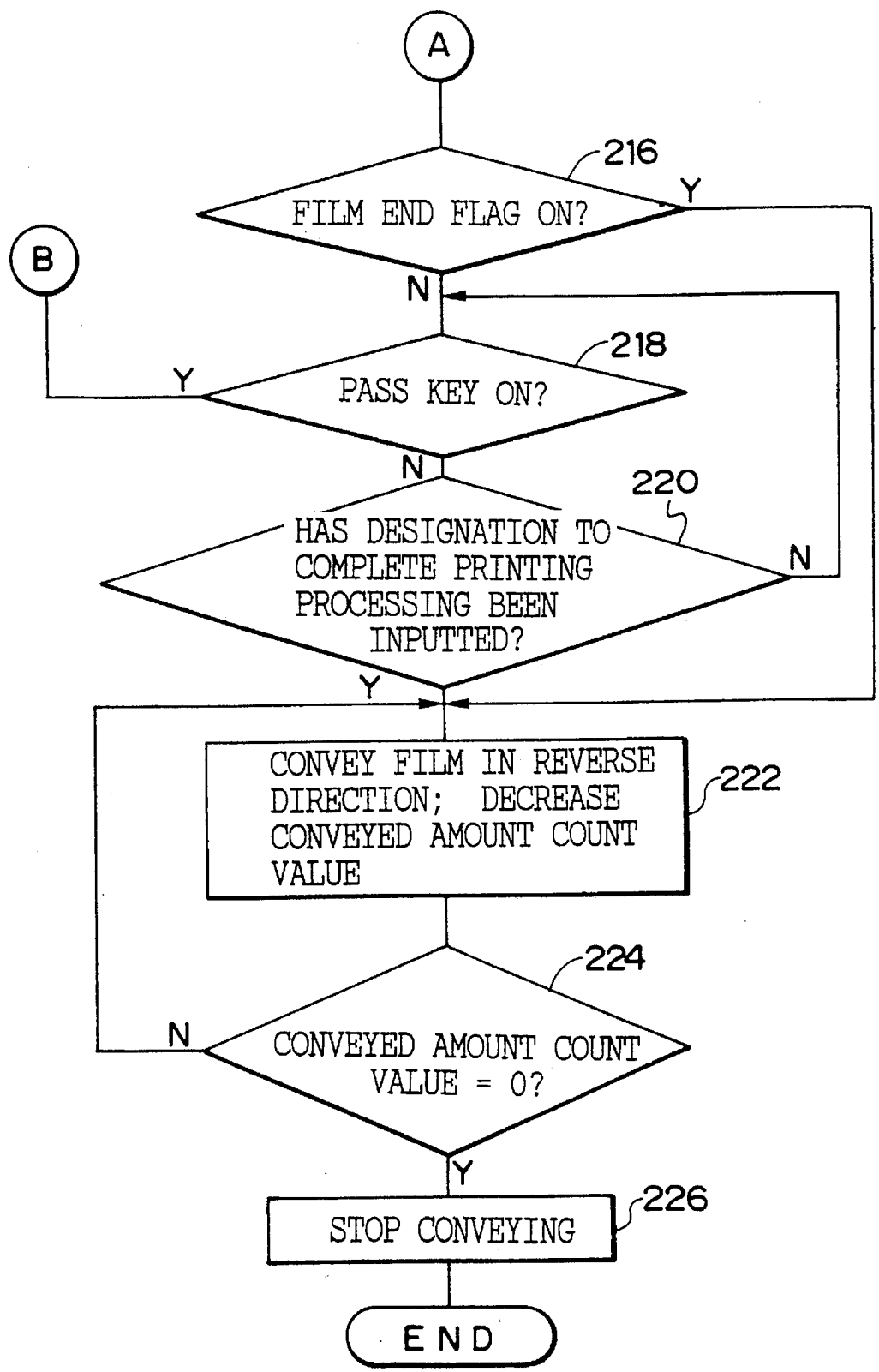

Next, negative film N conveying control/printing processing by the controller 182 will be explained with reference to the flowcharts in FIGS. 5A and 5B. In step 200, a determination is made as to whether setting of the negative film N at the negative carrier 30 has been completed. The answer to the determination in step 200 is "Yes" in a state in which the negative film N has been inserted into the negative film pass-through portion 30A, the leading end of the negative film N has been detected by the light sensor 172, and thereafter, the motor 152 has been driven slightly, and the leading end of the negative film N has been nipped between the drive roller 132 and the follower roller 142. When the answer to the determination in step 200 is "Yes", the process proceeds to step 202 where a conveyed amount count value is set to 0.

Figure 6:
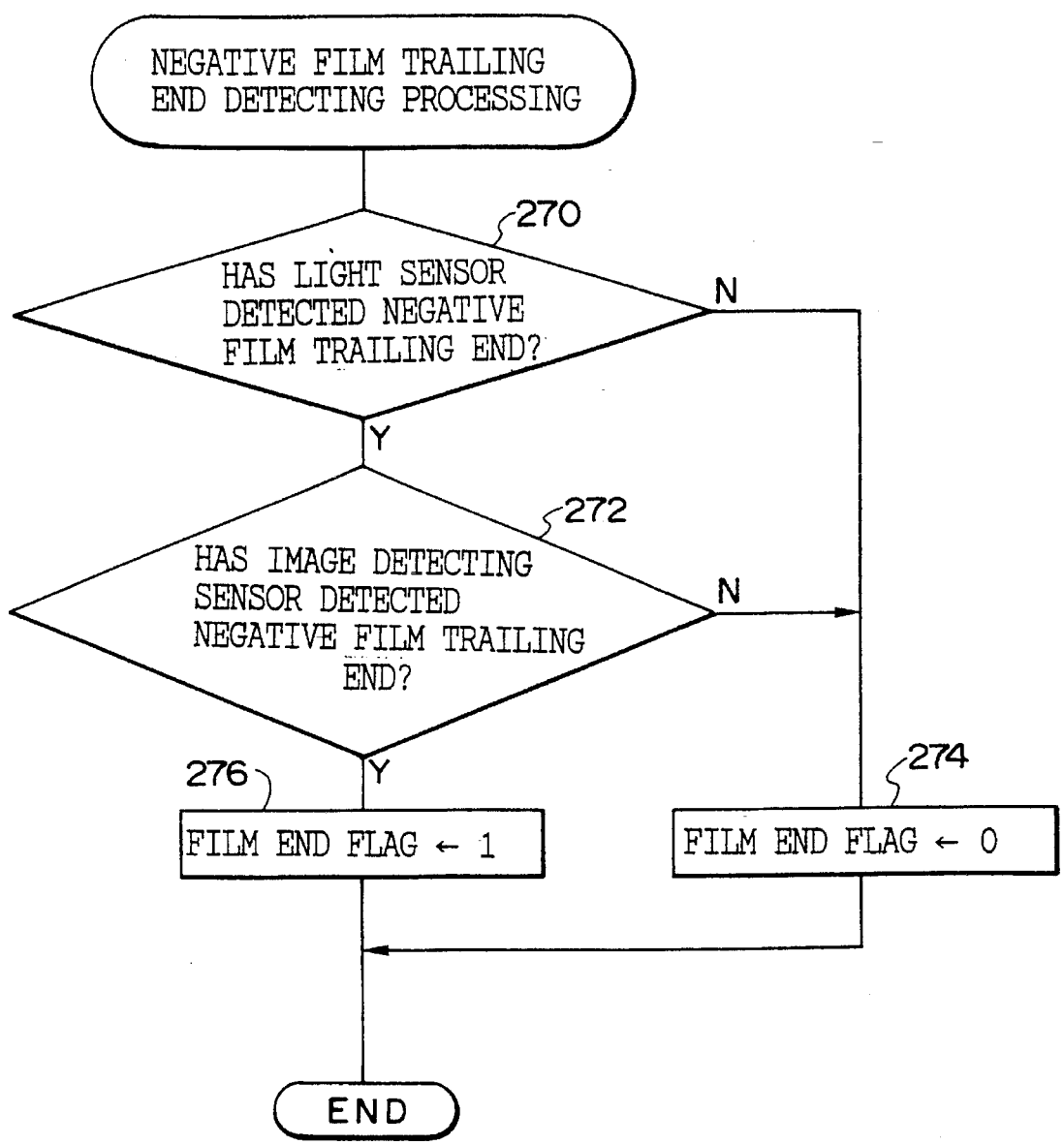
FIG. 6 is a flowchart explaining negative film trailing end detecting processing.

In subsequent step 204, the driving of the motor 152 is continued. The negative film N is conveyed in the forward direction, and the conveyed amount count value is increased synchronously with the conveyed amount of the negative film N. When the conveying of the negative film N begins, the negative film trailing end detecting processing illustrated in FIG. 6 is executed periodically, i.e., once per a predetermined amount of time, in parallel with the processing illustrated in FIGS. 5A and 5B.

Negative film trailing end detecting processing will be described with reference to the flowchart in FIG. 6. In step 270, a determination is made as to whether the trailing end of the negative film N is detected by the light sensor 172. When the answer to the determination in step 270 is "No", in step 274, the film end flag is set to 0, and processing ends. Further, when the answer to the determination in step 270 is "Yes", in step 272, a determination is made as to whether the trailing end of the negative film N has been detected by the image detecting sensor 176 as well.

When the answer to the determination in step 272 is "No", the process proceeds to step 274. When the answer to the determination in step 272 is "Yes", it is determined that the trailing end of the negative film N has reached a vicinity of the exposure position. In step 276, the film end flag is set to 1, and processing ends. As is clear from the above description, the detecting means of the present invention is realized in the present embodiment by the light sensor 172, the image detecting sensor 176, and the above-described negative film trailing end detecting processing.

Referring again to FIGS. 5A and 5B, when the conveying of the negative film N begins, in step 206, a determination is made as to whether the front side edge of the image has been detected by the image detecting sensor 176. At a negative film, generally, the density of a portion on which an image is exposed and recorded is higher than the density of an unexposed portion. Therefore, this determination can be effected by determining whether the density of the negative film N detected by the image detecting sensor 176 has suddenly increased.

If the answer to the determination in step 206 is "No", in step 208, a determination is made as to whether the negative film N has been conveyed a fixed amount after the edge of the image was detected. (The fixed amount is the amount by which the negative film N is conveyed to position, at the exposure position, the image whose front edge is positioned at the region at which the image detecting sensor 176 is disposed). At this time, because the edge of the image has not yet been detected, the answer to the determination in step 208 is also "No", and the process returns to step 204 and the conveying of the negative film N is continued. Further, when the answer to the determination in step 206 is "Yes", the process proceeds to step 210. The conveyed amount count value at that time is stored, and the process returns to step 204.

When the negative film N is conveyed the fixed amount after the edge of the image has been detected, the conveyed amount count value reaches a value which is the sum of the count value stored in step 210 and a value corresponding to the fixed amount, and the answer to the determination in step 208 is "Yes". When the answer Go the determination in step 208 is "Yes", it is determined that the image whose edge was previously detected has reached the exposure position. In step 212, the conveying of the negative film N is stopped, and the image is positioned at the exposure position. In subsequent step 214, the density of the image positioned at the exposure position is measured by the density measuring device 40. After the amount of correction of the exposure conditions has been computed, print-exposure processing is carried out in which the image is printed onto the photographic printing paper P at exposure conditions which have been corrected by the computed amount of correction.

Specifically, the positions of the respective filters of the light-adjusting filter portion 24 are moved in accordance with the corrected exposure conditions. Thereafter, the black shutter 41 is opened for an exposure time which corresponds to the corrected exposure conditions. The light, which was emitted from the exposure lamp 25 and which passed successively through the light-adjusting filter portion 24 and the negative film N, is printed onto the photographic printing paper P.

After print-exposure processing has been completed, the process proceeds to step 216 where a determination is made as to whether the film end flag has been set on (i.e., has been set to 1) by the previously-described negative film trailing end detecting processing. This determination corresponds to the determination effected by the determining means of the fourth aspect of the present invention. When the answer to the determination in step 216 is "No", in step 218, a determination is made as to whether the PASS key 186A has been turned on. If the answer to the determination in step 218 is "No", in step 220, a determination is made as to whether completion of printing processing has been designated by the turning on of the completion designating key 186B. If the answer to the determination in step 220 is also "No", the process returns to step 218. Steps 218, 220 are repeated until either the PASS key 186A or the completion designating key 186B is turned on.

When the PASS key 186A is turned on, the answer to the determination in step 218 is "Yes", and the process returns to step 204. As described above, the next image is positioned at the exposure position, and the black shutter 41 is opened for a predetermined period of time so that print-exposure processing of the positioned image onto the photographic printing paper P is repeated. The answer to the determination in step 220 is "Yes" after print-exposure has been effected for all of the images recorded on the negative film N, or when the completion designating key 186B is turned on even though print-exposure has not been completed for all of the images. When the answer to the determination in step 220 is "Yes", the process proceeds to step 222. Even in cases in which the completion designating key 186B is not on although print-exposure has been effected for all of the images recorded on the negative film N, the answer to the determination in step 216 is "Yes" when the film end flag is turned on due to the detecting of the trailing end of the negative film N by the negative film trailing end detecting processing. When the answer to the determination in step 216 is "Yes", the process proceeds to step 222.

Processing from step 222 on corresponds to processing by the control means of the first and second aspects of the present invention. Specifically, in step 222, the film is conveyed in a reverse direction, and the conveyed amount count value is decreased synchronously with the conveyed amount of the negative film N. In subsequent step 224, a determination is made as to whether the conveyed amount count value is 0. If the answer to the determination in step 224 is "No", the process returns to step 222. Steps 222, 224 are repeated until the answer to the determination in step 224 is "Yes". When the answer to the determination in step 224 is "Yes", in step 226, the conveying of the negative film N is stopped, and processing is completed.

At this time, the negative film N returns to the state at the time when the conveyed amount count value was set to 0 in step 202, i.e., the negative film N returns to the state in which the leading end thereof is nipped between the drive roller 132 and the follower roller 142. Because in this state the images are completely removed from the exposure position, the light is not illuminated to the images recorded on the negative film N, and the images do not fade.

In the first preferred embodiment, when the completion designating key 186B is turned on by the operator, even in cases in which print-exposure processing for all of the images recorded on the negative film N has not been completed, the negative film N is conveyed to a position at which the images do not fade. Further, even in cases in which the completion designation key 186B is not turned on although print-exposure processing has been completed for all of the images recorded on the negative film N, if the trailing end of the negative film N is detected, the negative film N is conveyed to a position at which the images do not fade. Therefore, the burden on the operator can be lessened, and fading of the images recorded on the film can be reliably prevented.

Second Embodiment

Figure 7A:
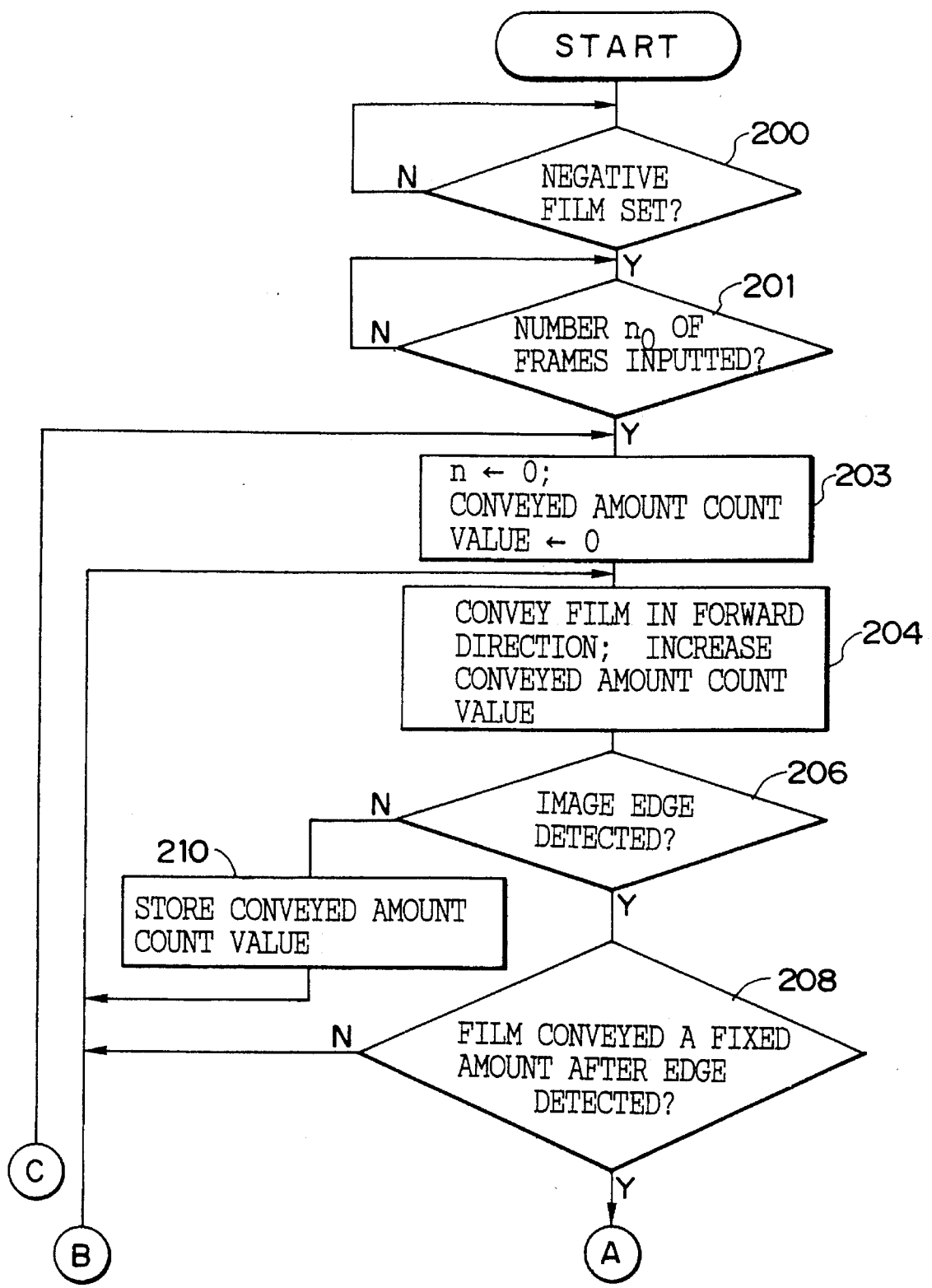
FIGS. 7A and 7B are flowcharts explaining negative film conveying control/printing processing relating to a second embodiment.
Figure 7B:
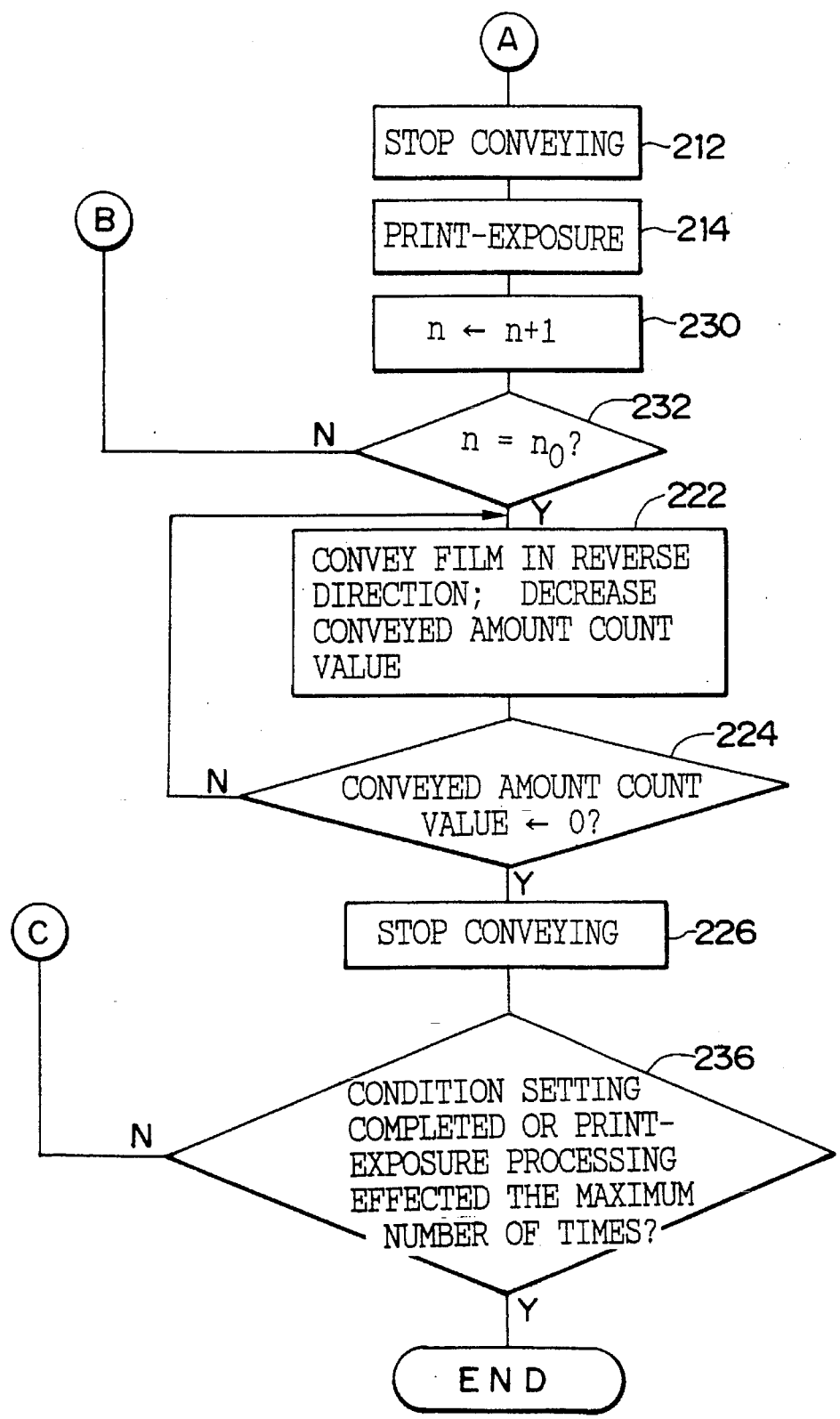

A second embodiment of the present invention will be described hereinafter. Because the second embodiment is structured similarly to the first embodiment, description of the structure of the second embodiment is omitted. FIGS. 7A and 7B illustrate conveying control/printing processing for a negative film N for condition setting/management, which processing is carried out in the second embodiment. Only portions of this processing which differ from the first embodiment will be described with reference to FIGS. 7A and 7B. The processing illustrated in FIGS. 7A and 7B is implemented when the negative film N for condition setting/management (hereinafter referred to in the present embodiment simply as the negative film N) is inserted in the negative carrier 30 and execution of condition setting or condition management is designated.

In the second embodiment, when the setting of the negative film N at the negative carrier 30 is completed and the answer to the determination in step 200 is "Yes", in step 201, a determination is made as to whether the number $n_0$ of frames of the images recorded on the negative film N has been inputted. The process stands by until the number of frames $n_0$ is inputted by the operator via the ten key 186C. Generally, a total of four images are recorded on a usual film for condition setting/management: an image for under exposure, an image for normal exposure, an image for over exposure and an image for extreme over exposure. When such a film for condition setting/management is used, "4" is inputted as the number $n_O$ of frames.

In subsequent step 203, in the same way as in the first embodiment, the conveyed amount count value is set to 0, and a counter n representing the number of images for which print-exposure processing has been effected is set to 0. Following steps 204 through 214 are the same as in the first embodiment. After the front side edge of the image is detected, the image is positioned at the exposure position by the negative film N being conveyed by a fixed amount. The black shutter 41 is opened for a predetermined amount of time, and the positioned image is printed onto the photographic printing paper P so that print-exposure processing is carried out. When print-exposure processing is carried out, in step 230, the counter n is increased by 1. In subsequent step 232, a determination is made as to whether the counter n is equal to the number $n_O$ of frames. Specifically, a determination is made as to whether print-exposure has been effected for all of the images to be printed which images are recorded on the negative film N. This determination corresponds to the determination by the determining means in the fifth aspect of the present invention. When the answer to the determination in step 232 is "No", the process returns to step 204. The next image is positioned at the exposure position, and print-exposure processing is repeated.

In a case in which the answer to the determination in step 232 is "Yes", in the same way as in the first embodiment, in steps 222 through 226, the negative film N is conveyed in the reverse direction until the conveyed amount count value becomes 0, and thereafter the conveying of the negative film N is stopped, and the process is set in a standby state. This standby state usually continues for several minutes. During this time, the leading end of the negative film N is nipped between the drive roller 132 and the follower roller 142, and the negative film N is completely apart from the exposure position. Therefore, the light is not illuminated to the images recorded on the negative film N for condition setting/management, and the images do not fade.

In step 236, a determination is made as to whether condition setting/managing processing has been completed, or whether print-exposure processing for the respective images recorded on the negative film N for condition setting/management has been effected a predetermined maximum number of times. The determination of step 236 corresponds to the determination effected by the determining means of the third aspect of the present invention. If print-exposure processing for the images recorded on the film for condition setting/management has been carried out the maximum number of times, the answer to the determination in step 236 is "Yes". If print-exposure processing has not been carried out the predetermined number of times, the standby state continues. Further, a key for designating completion of condition setting/managing processing may be provided as another key. The determination in step 236 as to whether condition setting/managing processing has been completed can be made by determining whether this completion designating key has been pressed by the operator.

In the standby state, the photographic printing paper P, on which images have been printed by the print-exposure processing carried out before, is subject to various processing such as developing, fixing, washing, drying and the like which requires several minutes. Thereafter, the densities of the respective images printed on the photographic printing paper P are measured by the densitometer 85. The controller 182 determines amounts of correction for correcting the exposure conditions on the basis of the image densities measured by the densitometer 85, and determines whether print-exposure processing of the images recorded on the negative film N for condition setting/management should be effected again.

When it is determined by the controller 182 that condition setting/managing processing is to be effected again, the answer to the determination in step 236 is "No", and the process returns to step 203. In this way, in the same way as described previously, print-exposure processing for the $n_O$ images recorded on the negative film N for condition setting/management is effected again. The answer to the determination in step 236 is "Yes" when it is determined that print-exposure processing for the respective images recorded on the negative film N for condition setting/management has been carried out a predetermined number of times and condition setting/managing processing has been completed, or when print-exposure processing for the respective images recorded on the negative film N for condition setting/management has been carried out the maximum number of times. When the answer to the determination in step 236 is "Yes", conveying control/printing processing for the negative film N for condition setting/management is completed.

In the second embodiment, when print-exposure for $n_O$ images recorded on the negative film N for condition setting/management is completed, the automatic conveying of the film for condition setting/management to a position at which the images do not fade due to light is repeated until it is determined that condition setting/managing processing has been completed. Therefore, long-time illumination of the light onto the images recorded on the negative film N for condition setting/management can be prevented. Fading of the images recorded on the negative film N for condition setting/management, which images are especially prone to fading due to periodic printing, can be prevented.

The above explanation describes an example in which the position at which light is not illuminated to any of the plurality of images recorded on the negative film N is the state in which the leading end of the negative film N is nipped between the drive roller 132 and the follower roller 142. However, the present invention is not limited to the same, and a state in which an unexposed portion (non-image portion) of the negative film N is positioned at the exposure position is applicable. Fading of the images can be prevented in this case as well.

The above explanation describes an example of a case in which a plurality of images recorded on the negative film N are successively print-exposed. However, the present invention is not limited to the same, and is applicable to cases such as additional printing in which only specific images among the plurality of images recorded on the negative film N are print-exposed, or cases in which print-exposure is carried out with only specific images being excluded.

The film relating to the present invention is not limited to the above-described negative film, and various types of films such as positive film or the like are applicable.

Third Embodiment

The film processor relating to the third embodiment of the present invention is equipped with a film carrier in which the conveying of the negative film N is continued for one image frame each time a PASS key for designating positioning of an image at the exposure position is turned on by an operator, and when a designation signal is inputted after print exposure of the final image frame nearest to the trailing end of the negative film N has been completed, the negative film N is not separated from the film carrier.

The third embodiment is structured substantially similarly to the above-described first embodiment. Therefore, parts which are the same are denoted by the same reference numerals, and description thereof is omitted. Only parts which are different will be described.

As described previously, the upper portion of the photographic printing section 12 is formed as the work table 11, and an operation panel 11A is disposed thereat. A PASS key serving as an inputting means is provided at the operation panel 11A illustrated in FIG. 8. When the PASS key is pushed, a designation signal, which expresses a designation to convey the negative film one image frame in order to effect print-exposure of the next image frame, is inputted to the controller 182. The operation panel 11A is provided with an exposure start key for giving a designation to start exposure. The operation panel 11A which is equipped with the PASS key and the exposure start key is connected to the controller 182.

A liquid crystal display device 18 is connected to the controller 182. Data measured by the density measuring device 40 is inputted to the controller 182. On the basis of the inputted data, the controller 182 projects the negative film N to the liquid crystal display device 18.

An encoder 132A is attached to the drive roller 132. The encoder 132A outputs one pulse to the controller 182 each time the drive roller 132 rotates a predetermined amount.

In the third embodiment, the light sensor 172, which is disposed at the negative film conveying direction upstream side of the drive roller 132 at the negative film pass-through portion 30A, is formed from a light-emitting element which emits light and a light-receiving element which receives the light from the light-emitting element, so as to detect the trailing end of the negative film N. Hereinafter in the third embodiment, the light sensor 172 will be called the trailing end detecting sensor 172 and serves as a photographic film end detecting means. In a case in which the light from the light-emitting element is blocked by the negative film N, the trailing end detecting sensor 172 does not output a signal to the controller 182. In a case in which the trailing end portion of the negative film N passes by the trailing end detecting sensor 172 and the light from the light-emitting element is received by the light-receiving element, the trailing end detecting sensor 172 outputs a signal to the controller 182. Note that the trailing end detecting sensor 172 and the window 119A are separated by a distance L.

In the third embodiment, the image detecting sensor 176, which is disposed at the negative film conveying direction downstream side of the splice sensor 174, is a line sensor which detects the edge of the image frame, and detects the density of the negative film N, and outputs a signal to the controller in accordance with the detected density. Hereinafter in the third embodiment, the image detecting sensor 176 will be called the edge detecting sensor 176 and serves as an image frame detecting means. The densities of the image frames of the negative film N are high, and the densities of regions other than the image frames are low. Therefore, when a region other than an image frame is positioned at the edge detecting sensor 176, the signal output to the controller is on. When an image frame is positioned at the edge detecting sensor 176, the signal output to the controller is off. When the image frame positioned nearest to the negative film end at the negative film conveying direction upstream side (hereinafter, "the final image frame") is positioned at the edge detecting sensor 176, there are P0 image frames which have not yet been print-exposed.

The sensors 172, 174, 176, the encoder 132A, the motor 152, the operation panel 11A and the liquid crystal display device 18 are respectively connected to the controller 182. The motor 152, the pulleys 140C, 154, the timing belt 156, the drive rollers 132, 134, 136, 138, the follower rollers 142, 144, 146, 148, and the controller 182 correspond to the conveying means of the present invention.

Next, operation of the third embodiment will be described with reference to the flowchart (FIG. 9) illustrating the main routine of the third embodiment.

First, the operator sets the lead image frame of the negative film N in a state in which exposure is possible. Specifically, the operator opens the cover 112 and places the lead image frame of the negative film N at the window portion 119A of the under negative mask 118. Thereafter, the operator pivots the holder 114 so that the upper negative mask 116 abuts the mask 118. Electric power is supplied to the solenoid 117, the negative film N is nipped by the mask 116 and the mask 118, and the cover 112 is closed.

In this way, when the lead image frame is set in a state in which exposure is possible and the exposure start key of the operation panel 11A is turned on, the photographic printing paper P is print-exposed by the light beam from the light source device 96. The print-exposed photographic printing paper P passes through the recording path 60 and is delivered into the processor section 72. The photographic printing paper P is conveyed in a substantial U-shape within the developing tank 74 so as to undergo developing processing. Next, the photographic printing paper P is conveyed in a substantial U-shape within the bleaching/fixing tank 76 and the washing tank 78 respectively, so as to undergo bleaching/fixing processing and washing processing. The photographic printing paper P is then conveyed to the drying section 80. The photographic printing paper P which has been discharged from the drying section 80 is nipped by the plurality of pairs of rollers, is discharged to the exterior of the printer processor 10 and is accumulated with other discharged papers.

In this way, when print-exposure is completed, the operator turns the PASS key of the operation panel 11A on in order to convey the negative film N one image frame so as to effect print-exposure of the next image frame. In step 302, a determination is made as to whether the PASS key has been turned on. When the PASS key is turned on, in step 304, by determining whether a time T is greater than a predetermined time T0, a determination is made as to whether the final image frame has passed the edge detecting sensor 176. When the answer to this determination is "No", there are image frames which have not yet been print-exposed. Therefore, in step 306, the negative film N is conveyed one image frame, and the process returns to step 302.

Hereinafter, the method for determining whether the final image frame has passed the edge detecting sensor 176 will be described.

Figure 10:
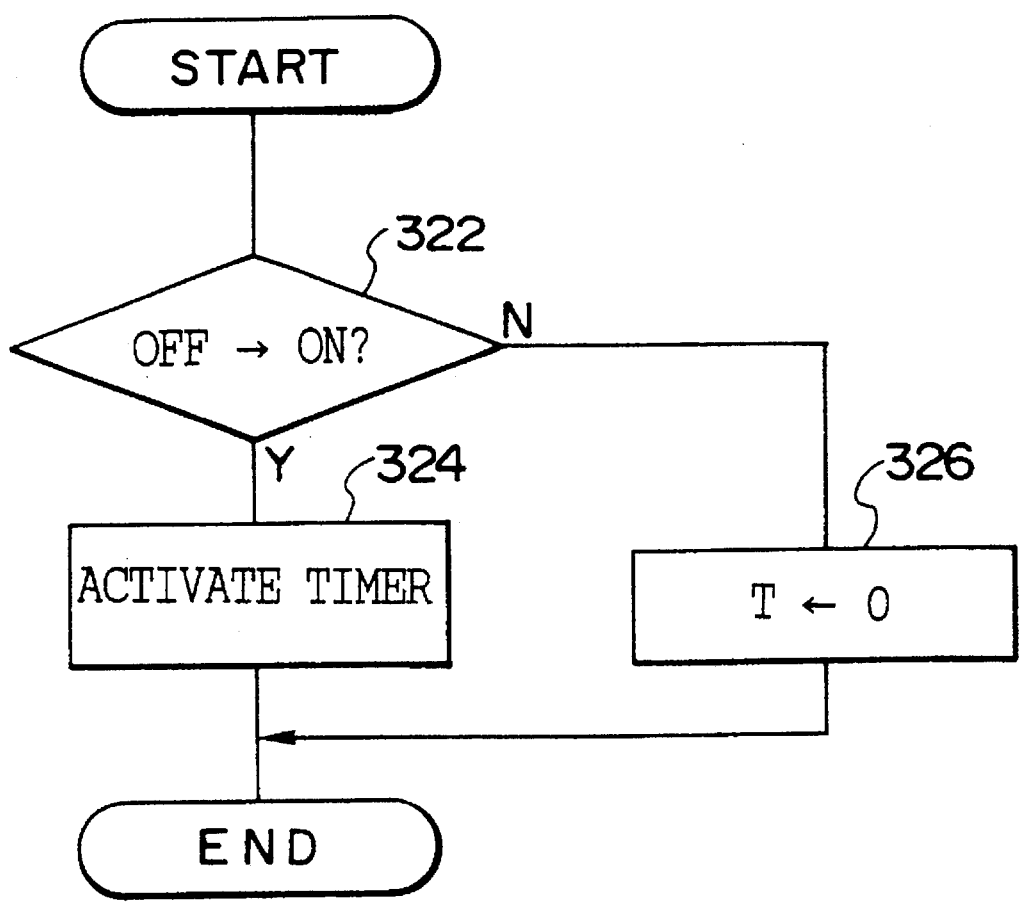
FIG. 10 is a flowchart illustrating an interruption processing routine which interrupts and is executed when the signal output from an edge detecting sensor is turned on and off.

FIG. 10 illustrates an interruption processing routine which interrupts and which is executed by the turning on and off of the signal output from the edge detecting sensor 176.

As described previously, the edge detecting sensor 176 turns the signal output to the controller on and off in accordance with the detected density of the negative film N. Therefore, this processing routine is implemented due to the signal output switching from on to off and switching from off to on. In step 322, by determining whether the signal output from the edge detecting sensor 176 has switched from off to on, a determination is made as to whether the conveying direction upstream side edge of an image frame has passed the edge detecting sensor 176. Specifically, an image frame is positioned at the conveying direction upstream side of the edge detecting sensor 176, and signal output of the edge detecting sensor 176 is off. When the edge passes by the edge detecting sensor 176, the signal output from the edge detecting sensor 176 is turned on. In this way, in a case in which a conveying direction upstream side edge of an image frame passes by the edge detecting sensor 175 and the signal output from the edge detecting sensor 175 switches from off to on (i.e., when the answer to the determination in step 322 is "Yes"), in step 324, a timer is driven, and the time T from the time at which the conveying direction upstream side edge of the image frame passes by the edge detecting sensor is detected. The interruption processing routine ends. An unillustrated soft timer of the controller 182 is used for this timer.

When the conveying direction upstream side edge of the image frame passes by the edge detecting sensor 176 and the negative film N is conveyed so that the conveying direction downstream side edge of the next image frame passes by the edge detecting sensor 176, the signal output of the edge detecting sensor 176 switches from on to off. As a result, this routine interrupts and is executed. In this case, the signal output of the edge detecting sensor 176 is on, and due to the conveying direction downstream side edge of the image frame passing by the edge detecting sensor 176, the signal output is turned off. Therefore, the answer to the determination in step 322 is "No", and the process proceeds to step 326. In step 326, the driving of the timer is turned off, the time T is set to 0, and this interruption processing routine ends.

Here, the period of time from the timer when the negative film N is conveyed and the conveying direction upstream side edge of the image frame for which print-exposure has been completed passes by the edge detecting sensor 176, to the time, when the conveying direction downstream side edge of the next image frame passes by the edge detecting sensor 176, is set to a fixed time T because the recording intervals between the image frames recorded on the negative film N are determined in advance.

After the conveying direction upstream side edge of the final image frame passes by the edge detecting sensor 176, the signal output from the edge detecting sensor 176 is not turned off by the passing of the edge of the next image frame. The driving of the timer continues as is, and the time T becomes greater than the time T0. Accordingly, by determining whether the time T has become greater than the time T0, a determination can be made as to whether the final image frame has passed by the edge detecting sensor 176.

Here, when the PASS key is turned on in a state in which the final image frame is positioned at the edge detecting sensor 176, the processes of steps 304, 306 are carried out. In a state in which there are P0 image frames which have not yet been print-exposed, the process waits for the PASS key to be turned on. When the PASS key is turned on, the answer to the determination in step 304 is "Yes", and in step 308, a determination is made as to whether P0 image frames have been conveyed. When the answer to this determination is "No", in step 306, the negative film N is conveyed one image, and the process returns to step 302. In this way, when P0 image frames have been conveyed, print-exposure of the final image frame is completed. The answer to the determination in step 308 is "Yes", and in step 310, a determination is made as to whether a flag F (which will be described in detail hereinafter) is set to 1. When the answer to this determination is "No", in step 306, the negative film N is conveyed one image. When the answer to the determination in step 310 is "Yes", in step 312, the negative film N is conveyed the distance L (which will be described in detail hereinafter), and this processing ends.

The flag F and the distance L will be described hereinafter.

Figure 11:
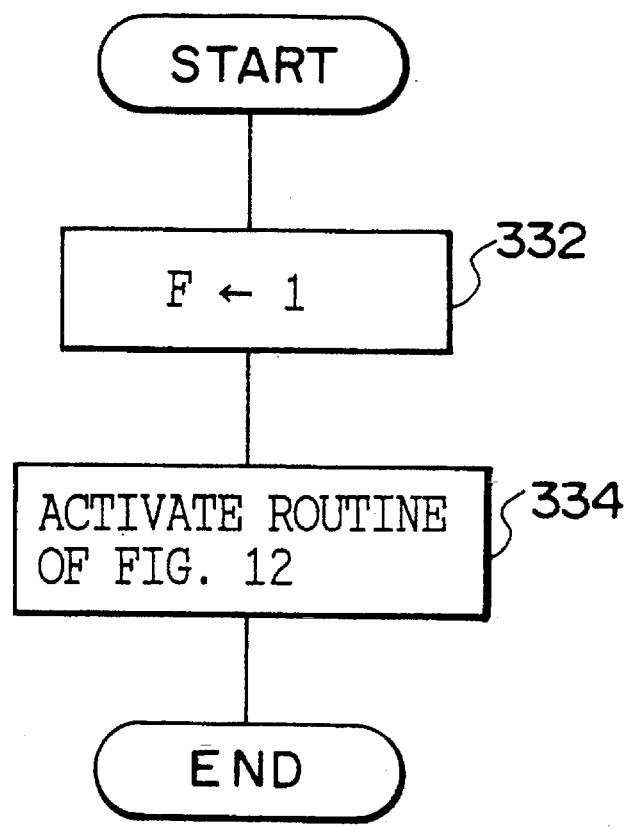
FIG. 11 is a flowchart illustrating an interruption processing routine which interrupts and is executed when a signal from a trailing end detecting sensor is inputted.

FIG. 11 illustrates an interruption processing routine which interrupts and is executed in a case in which a signal is inputted from the trailing end detecting sensor 172.

Figure 12:
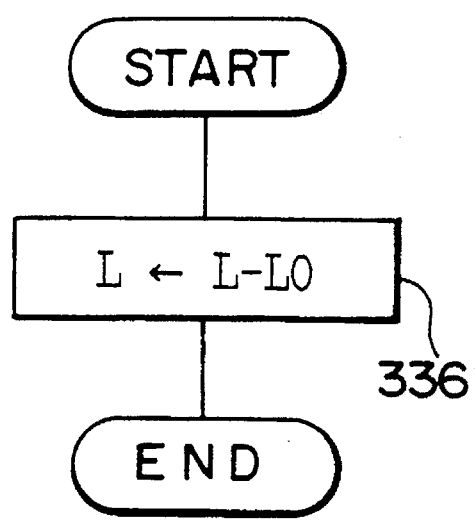
FIG. 12 is a flowchart illustrating a routine for detecting the distance from a trailing end of a negative film to a central position of a window.

When the trailing end of the negative film N passes by the trailing end detecting sensor 172 and the signal from the trailing end detecting sensor 172 is inputted to the controller 182, because the trailing end of the negative film N has been detected, in step 332, the flag F is set to 1. Then, in step 334, the routine illustrated in FIG. 12 is activated. FIG. 12 illustrates a routine for detecting the distance L from the trailing end of the negative film N to the central position of the window 119A. After the routine in FIG. 12 is activated in step 334 of the routine of FIG. 11, the routine in FIG. 12 is repeated each time a pulse from the encoder 132A attached to the drive roller 132 is inputted. Specifically, when a pulse from the encoder 132A is inputted, in step 336, a distance L0, which corresponds to one pulse from the encoder 132A, is subtracted from the distance L, which is from the trailing end detecting sensor 172 to the central position of the window 119A, and this routine ends. Because the distance L0 corresponding to one pulse from the encoder 132A is subtracted from the distance L from the trailing end detecting sensor 172 to the central position of the window 119A, the distance L from the trailing end of the negative film N which has passed by the trailing end detecting sensor 172 to the central position of the window 119A can be detected.

Figure 9:
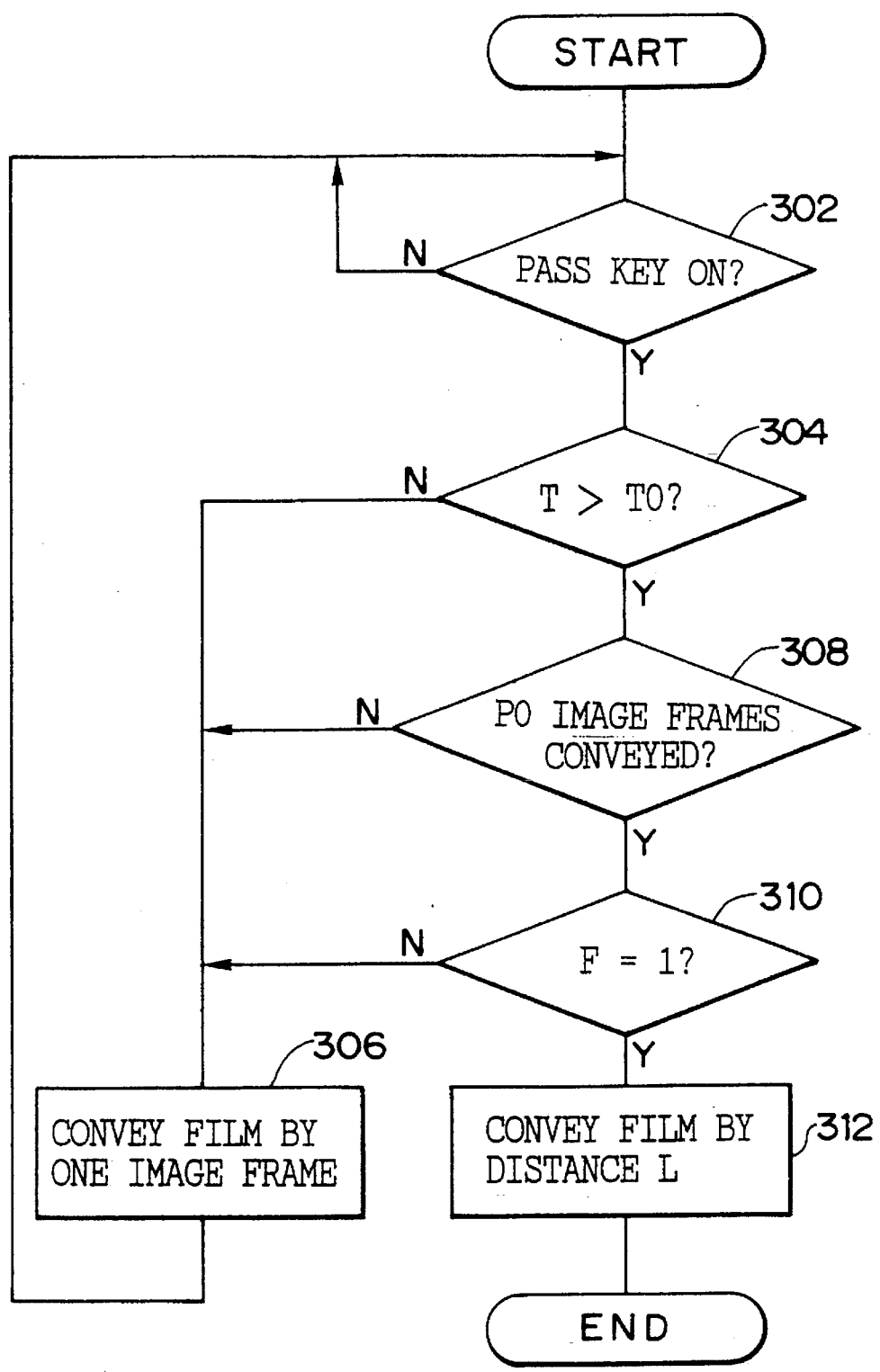
FIG. 9 is a flowchart illustrating a main routine of the third embodiment.

In this way, in step 310 of the routine in FIG. 9, when a determination is made that the flag F has been set to 1, in step 312, when the negative film N is conveyed the distance L, the trailing end of the negative film N is positioned at the central position of the window 119A.

In the above-described embodiment, when the PASS key is turned on in a state in which print-exposure of the final image frame has been completed and the trailing end of the negative film N has been detected, because the trailing end of the negative film N is positioned at the central position of the window, the negative film does not separate from the negative carrier. Accordingly, the work involved in the operator reloading the negative film at the negative carrier can be eliminated.

In the above embodiment, because the trailing end of the negative film N is positioned at the central position of the window 119A, the operator can view the trailing end of the negative film N positioned at the central position of the window portion 119A, via the gap between the negative carrier 30 and the diffusion box 28 illustrated in FIG. 1. Accordingly, the operator can know that there is no subsequent image frame to be print-exposed. Further, in a case in which the liquid crystal display device 18 which projects the negative film N is provided as in the above-described embodiment, the trailing end of the negative film N is projected on the monitor of the liquid crystal display device 18. Therefore, the operator can know that there is no subsequent image frame to be print-exposed.

In the above-described embodiment, although the lead image frame of the negative film N is manually placed at the window 119A, the present invention is not limited to the same, and the lead image frame may automatically be placed at the window 119A. Specifically, the negative film N can be set so as to be nipped and conveyed by the drive roller 132 and the follower roller 142. The conveying of the negative film N begins, and when the edge of the lead image frame is detected by the edge detecting sensor 176, the negative film N is conveyed the distance from the edge detecting sensor 176 to the window 119A and stopped.

In the above embodiment, when the PASS key is turned on in a state in which print-exposure of the final image frame has been completed and the trailing end of the negative film N has been detected, the trailing end of the negative film N is positioned at the central position of the window 119A. However, the present invention is not limited to the same, and the trailing end may be positioned at another position. For example, the trailing end may be positioned at any position within the range of the window 119A other than the central position of the window 119A, or may be positioned in the vicinity of the conveying direction upstream side of the roller which is positioned the furthest downstream in the conveying direction.

The above explanation describes an example in which the negative film N is conveyed in only one direction. However, the present invention is not limited to the same, and the negative film N may be conveyed in both forward and reverse directions. Specifically, in this case, a sensor having the same functions as the edge detecting sensor 176 (see FIGS. 3 and 8) is disposed at the side of the window 119A opposite the edge detecting sensor 176.

In this case, for example, while the negative film N is conveyed in the conveying direction of the previously-described embodiment (the forward direction), the operator refers to the liquid crystal display device 18 and selects an image of an image frame to be print-exposed by turning on a positive image conversion key of the operation panel 11A. In this way, the image is converted into a positive image. Further, in this case, the number of the selected image frame is stored.

When print-exposure processing or conversion processing to a positive image has been completed, the negative film N is conveyed in the reverse direction. In this case, because the trailing end of the negative film N is positioned at the central position of the window 119A (or at another position as described above), the negative film N does not separate from the negative carrier, and the negative film N can be reliably conveyed in the reverse direction.

For example, in a case in which the image frame positioned at the trailing end of the negative film N (or at the leading end in a case in which the negative film N is conveyed in the reverse direction) is selected to be print-exposed again, when this image frame is detected by the sensor which is disposed at the side of the window 119A opposite the edge detecting sensor 176, the negative film N is conveyed the distance from the sensor to the window 119A, and print-exposure is effected again. When the negative film N is conveyed in the reverse direction, as described above, print-exposure of selected image frames may be effected each time the PASS key is turned on.

In this way, even in a case in which the negative film N is conveyed in both forward and reverse directions and image frames are print-exposed or the like, the trailing end of the negative film N is positioned at the central position of the window 119A (or at another position as described above), Therefore, the negative film N can be reliably conveyed in the reverse direction, and the operatability improves.

In the above-described embodiment, the image frames of one negative film are print-exposed. However, the present invention is not limited to the same. A plurality of negative films may be connected by splicing tape, and the image frames thereof may be subject to printing processing. In this case, when the splicing tape is detected by the splice sensor 174 and print-exposure of all of the image frames of one negative film has been completed, the trailing end of that negative film is positioned at the central position of the window 119A (or at another position described above). Therefore, while observing the liquid crystal display device 18, or while observing the central position of the window 119A via the gap between the diffusion box 28 and the negative carrier 30, the operator can designate the driving of the motor so that the lead image frame of the next negative film is positioned at the central position of the window 119A.

In this way, in a case in which a plurality of negative films are connected by splicing tape and printing processing of the image frames is carried out, the photographic printing papers P can be sorted and stacked in correspondence with the negative films. Specifically, a stocker may be provided at the upper portion of the processor section 72. Photographic printing papers P, for which drying processing has been completed and which have been discharged from the drying section 80, are discharged and stacked in the stocker. The stocker is moved in accordance with the detection of the splicing tape. The photographic printing papers P on which the image frames have been print-exposed are sorted per negative film and are stacked in the respective stockers.

In the above-described embodiments, explanation is given of examples in which negative films are used. However, the present invention is not limited to the same, and for example, a photographic film such as a positive film or the like may be used. Further, although a line sensor is used as the edge detecting sensor, the present invention is not limited to the same, and for example, a two-dimensional image sensor such as a CCD camera or the like may be used.

In the above-described embodiments, the negative film is conveyed a predetermined amount so that the next image frame is positioned at the exposure position. However, the present invention is not limited to the same. Notches may be provided in one-to-one positional correspondence with the image frames. Such notches may be detected by a notch detecting sensor, e.g., a sensor formed by a light-emitting element which emits light and a light-receiving element which receives the light, or may be detected by using a two-dimensional image sensor such as a CCD camera or the like. The image frames are then positioned at the exposure position on the basis of the detected notches.

As described above, in the first aspect of the present invention, a designating means is provided for designating the completion of printing of the images recorded on the film. When completion of printing is designated by the designating means, the control means effects control such that the film is conveyed to a position at which the light is not illuminated to any of the plurality of images, wherein the conveying means retains the film at the position in a state in which the film is nipped by the conveying means. Therefore, superior effects can be achieved in that the burden on the operator can be lessened, and fading of the images recorded on the film can be prevented.

In the second aspect of the present invention, a determining means is provided for determining whether printing of all of the images, which are recorded on the film and which are to be printed, has been completed. When the determining means determines that printing has been completed, the control means effects control such that the film is conveyed to a position at which the light is not illuminated to any of the plurality of images, wherein the conveying means retains the film at the position in a state in which the film is nipped by the conveying means. Therefore, the burden on the operator can be lessened, and fading of the images recorded on the film can be prevented.

In the third aspect of the present invention, in the second aspect, when a plurality of images recorded on a film for condition setting/management are to be printed, the conveying means is controlled to convey the film to a position at which the light is not illuminated to any of the plurality of images, wherein the conveying means retains the film at the position in a state in which the film is nipped by the conveying means, each time a determination is made that printing has been completed, until it is determined that condition setting/managing processing has been completed. Therefore, in addition to the above-described effects, fading of the images recorded on a film for condition setting/management, which images are particularly prone to fading, can be prevented.

In the fourth aspect of the present invention, the second aspect is further provided with a detecting means which is disposed in a vicinity of the exposure position and detects the end portion of the film. In a case in which the end portion of the film is detected by the detecting means, it is determined that printing of all of the images to be printed has been completed. Therefore, in addition to the above effects, there is no need for the operator to engage in superfluous work, and the burden on the operator can be further reduced.

In the fifth aspect of the present invention, the second aspect is further provided with a designating means for designating a number of frames of images to be printed. When printing of images of the number of frames designated by the designating means is completed, it is determined that printing of all of the images which were to be printed has been completed. Therefore, in addition to the above-described effects, an excellent effect is achieved in that it can be reliably and quickly determined that printing of all of the images to be printed has been completed.

In the sixth and seventh aspects of the present invention, when a designation signal is inputted and the image frame positioned nearest to the end of the photographic film is positioned in a conveying direction downstream side region which includes the exposure position, the photographic film is conveyed such that the end of the photographic film is positioned at a position at which the end does not separate from the conveying means. Therefore, a superior effect is achieved in that, due to the inputting of the designation signal, separation of the photographic film from the conveying means can be prevented.

What is claimed is:

1. A photographic printing device comprising:
   conveying means for conveying a film on which a plurality of images are recorded;
   positioning means for positioning, at an exposure position, an image recorded on the film conveyed by said conveying means;
   printing means for printing onto a photosensitive material the image positioned at the exposure position by said positioning means, by illuminating light to the image;
   designating means for designating completion of printing of images recorded on the film; and
   control means for controlling said conveying means to convey the film to a position at which the light from said printing means is not illuminated to any of the plurality of images, when completion of printing is designated by said designating means, wherein the conveying means retains the film at the position in a state in which the film is nipped by the conveying means.

2. A photographic printing device according to claim 1, wherein said control means controls said conveying means to convey the film such that a portion of the film on which images are not recorded is positioned at the exposure position when completion of printing is designated.

3. A photographic printing device according to claim 1, wherein said control means controls said conveying means to convey the film such that the film is not positioned at the exposure position when completion of printing is designated.

4. A photographic printing device according to claim 1, wherein a designation of completion of printing is effected by an operator via said designating means.

5. A photographic printing device according to claim 1, further comprising:
   detecting means for detecting an end portion of the film at a film conveying direction upstream side of said exposure position,
   wherein on the basis of detection of the end portion of the film by said detecting means, said control means controls said conveying means to convey the film to the position at which the light is not illuminated to any of the plurality of images.

6. A photographic printing device according to claim 1, further comprising:
   determining means for determining whether printing of all images, which are recorded on the film and which are to be printed, has been completed,
   wherein when said determining means determines that printing of said all images has been completed, said control means controls said conveying means to convey the film to a position at which the light is not illuminated to any of the plurality of images.

7. A photographic printing device according to claim 6, further comprising:
   detecting means for detecting an end portion of the film at a film conveying direction upstream side of said exposure position,
   wherein on the basis of detection of the end portion of the film by said detecting means, said determining means determines whether printing of all images to be printed has been completed.

8. A photographic printing device according to claim 1, wherein said control means counts up a predetermined amount synchronously with conveying of the film by said conveying means, and controls said conveying means based on a count value at a time that said designating means designates completion of printing.

9. A photographic printing device according to claim 1, wherein, when said designating means designates completion of printing, said control means controls said conveying means to convey the film in one of the same direction as a conveying direction and a direction opposite to a conveying direction in which the film was conveyed before said designating means designated completion of printing, and synchronously with conveying of the film in the one of the same direction and the opposite direction, said control means one of subtracts and adds a predetermined amount to the count value which said control means has counted up at the time said designating means designated completion of printing, and said control means controls said conveying means to stop conveying of the film at a time when a value, which is the count value to which the predetermined amount has been one of subtracted and added, reaches a predetermined value.

10. A photographic printing device comprising:
    conveying means for conveying a film on which a plurality of images are recorded;
    positioning means for positioning, at an exposure position, an image recorded on the film conveyed by said conveying means;
    printing means for printing onto a photosensitive material the image positioned at the exposure position by said positioning means, by illuminating light to the image;
    determining means for determining whether printing of all images, which are recorded on the film and which are to be printed, has been completed; and
    control means for controlling said conveying means to convey the film to a position at which the light from the printing means is not illuminated to any of the plurality of images, when said determining means determines that printing has been completed, wherein the conveying means retains the film at the position in a state in which the film is nipped by the conveying means.

11. A photographic printing device according to claim 10, wherein said control means controls said conveying means to convey the film such that a portion of the film on which images are not recorded is positioned at the exposure position.

12. A photographic printing device according to claim 10, wherein said control means controls said conveying means to convey the film such that the film is not positioned at the exposure position.

13. A photographic printing device according to claim 10, further comprising:
    detecting means for detecting an end portion of the film at a film conveying direction upstream side of said exposure position,
    wherein on the basis of detection of the end portion of the film by said detecting means, said control means controls said conveying means to convey the film to a position at which the light is not illuminated to any of the plurality of images.

14. A photographic printing device according to claim 10, wherein when printing of a plurality of images recorded on a film for condition setting/management is effected, said determining means also determines whether condition setting/managing processing has been completed, and until said determining means determines that condition setting/managing processing has been completed, each time said determining means determines that printing has been completed, said control means controls said conveying means to convey the film for condition setting/management to a position at which the light is illuminated to none of the plurality of images.

15. A photographic printing device according to claim 14, wherein the plurality of images recorded on the film for condition setting/management include an image for normal exposure which is exposed at a standard exposure amount, an image for under exposure which is exposed at an exposure amount lower than the standard exposure amount, an image for over exposure which is exposed at an exposure amount greater than the standard exposure amount, and an image for extreme over exposure which is exposed at an exposure amount greater than the exposure amount of the image for over exposure.

16. A photographic printing device according to claim 14, wherein the condition setting/managing processing is setting and managing conditions of an illuminated amount of the light which is illuminated by said printing means to the image positioned at the exposure position.

17. A photographic printing device according to claim 14, wherein on the basis of a designation from an operator to complete condition setting/managing processing, said determining means determines that condition setting/managing processing is completed.

18. A photographic printing device according to claim 10, further comprising:

detecting means for detecting an end portion of the film at a film conveying direction upstream side of said exposure position, wherein on the basis of detection of the end portion of the film by said detecting means, said determining means determines whether printing of all images to be printed has been completed.

19. A film carrier comprising:

inputting means for inputting a designation signal which designates conveying of a photographic film on which image frames are recorded and positioning at an exposure position of an image frame to be print-exposed onto a photosensitive material;

conveying means for conveying the photographic film;

photographic film end portion detecting means for detecting a photographic film end portion at a conveying direction upstream side of said exposure position;

determining means for determining whether an image frame located at a position nearest to the photographic film end portion is positioned in a conveying direction downstream side region which includes the exposure position; and control means for controlling said conveying means to convey the photographic film such that the image frame to be print-exposed is positioned at the exposure position, when results of the determination of said determining means are negative and the designation signal is inputted, and for controlling said conveying means to convey the photographic film such that the photographic film end portion detected by said photographic film end portion detecting means is positioned at a position at which the photographic film end portion does not separate from said conveying means, when results of the determination of said determining means are affirmative and the designation signal is inputted.

20. A film carrier according to claim 19, wherein the position at which the photographic film end portion does not separate from said conveying means is any position within a predetermined range which includes the exposure position.

* * * * *